US012237132B2

(12) United States Patent
Kamor et al.

(10) Patent No.: US 12,237,132 B2
(45) Date of Patent: Feb. 25, 2025

(54) CIRCUIT BREAKERS INCORPORATING RESET LOCKOUT MECHANISMS

(71) Applicant: Leviton Manufacturing Co., Inc., Melville, NY (US)

(72) Inventors: Michael Kamor, North Massapequa, NY (US); Stephen Aaron, East Patchogue, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 18/420,027

(22) Filed: Jan. 23, 2024

(65) Prior Publication Data

US 2024/0161992 A1 May 16, 2024

Related U.S. Application Data

(60) Continuation of application No. 18/112,873, filed on Feb. 22, 2023, now Pat. No. 11,901,148, which is a (Continued)

(51) Int. Cl.
*H01H 71/62* (2006.01)
*H01F 7/16* (2006.01)
(Continued)

(52) U.S. Cl.
CPC ........... *H01H 71/54* (2013.01); *H01F 7/1607* (2013.01); *H01H 71/2463* (2013.01); *H01H 71/62* (2013.01); *H01H 71/64* (2013.01)

(58) Field of Classification Search
CPC ........................................... H01H 71/62–71/64
See application file for complete search history.

(56) References Cited

U.S. PATENT DOCUMENTS 3,113,245 A 12/1963 Hoffman
3,786,311 A 1/1974 Hobson, Jr. et al.
(Continued)

FOREIGN PATENT DOCUMENTS

CN 204332850 U 5/2015
CN 204760342 U 11/2015
(Continued)

OTHER PUBLICATIONS

Chinese First Office Action dated Oct. 12, 2019 corresponding to CN Patent Application No. 201780049007.4, with English translation.
(Continued)

*Primary Examiner* — Ramon M Barrera
(74) *Attorney, Agent, or Firm* — Carter, DeLuca & Farrell LLP; George Likourezos; Bret P. Shapiro

(57) ABSTRACT

A circuit breaker includes a line phase terminal, a load phase terminal, a line neutral terminal, a conductive path formed between the line phase terminal and the load phase terminal, the conductive path having an open configuration and closed configuration, a sensor, a linkage configured to move the conductive path between the open configuration and the closed configuration, a rocker selectively engageable with the linkage, the rocker configured to move the linkage between an open position and a closed position, and an arm selectively engageable with the rocker, the arm to prevent the conductive path from moving to the closed configuration unless the circuit breaker passes a self-test when movement of the rocker is detected. A trip operation of the circuit breaker includes a time delay based upon an amount of current on the conductive path detected by the sensor.

19 Claims, 40 Drawing Sheets

Related U.S. Application Data division of application No. 16/707,535, filed on Dec. 9, 2019, now Pat. No. 11,610,751.

(51) Int. Cl.

| | |
|---|---|
| ***H01H 71/24*** | (2006.01) |
| ***H01H 71/54*** | (2006.01) |
| ***H01H 71/64*** | (2006.01) |

(56) References Cited

U.S. PATENT DOCUMENTS

| | | | |
|---|---|---|---|
| 3,840,783 | A | 10/1974 | Eckart |
| 3,949,272 | A | 4/1976 | Smith |
| 4,091,433 | A | 5/1978 | Wilkinson |
| 4,329,727 | A | 5/1982 | Premeriani |
| 4,521,824 | A | 6/1985 | Morris et al. |
| 4,595,894 | A | 6/1986 | Doyle et al. |
| 4,631,625 | A | 12/1986 | Alexander et al. |
| 4,641,217 | A | 2/1987 | Morris et al. |
| 4,814,712 | A | 3/1989 | Burton et al. |
| 5,414,395 | A | 5/1995 | Garnto et al. |
| 5,453,723 | A | 9/1995 | Fello et al. |
| 5,477,201 | A | 12/1995 | Garnto et al. |
| 5,481,235 | A | 1/1996 | Heise |
| 5,483,211 | A | 1/1996 | Carrodus et al. |
| 5,510,945 | A | 4/1996 | Taylor et al. |
| 5,889,643 | A | 3/1999 | Elms |
| 5,933,063 | A | 8/1999 | Keung et al. |
| 5,940,257 | A | 8/1999 | Zavis |
| 6,014,297 | A | 1/2000 | Clarey et al. |
| 6,040,967 | A | 3/2000 | DiSalvo |
| 6,052,046 | A | 4/2000 | Ennis et al. |
| 6,288,882 | B1 | 9/2001 | Disalvo et al. |
| 6,417,671 | B1 | 7/2002 | Tiemann |
| 6,538,862 | B1 | 3/2003 | Mason, Jr. et al. |
| 6,734,768 | B2 | 5/2004 | Kim |
| 6,864,447 | B1 | 3/2005 | Lipsey, II |
| 6,897,747 | B2 | 5/2005 | Brandon |
| 6,961,226 | B2 | 11/2005 | Mason, Jr. et al. |
| 7,019,606 | B2 | 3/2006 | Williams et al. |
| 7,061,349 | B2 | 6/2006 | Castonguay et al. |
| 7,161,780 | B2 | 1/2007 | Germain et al. |
| 7,298,606 | B2 | 11/2007 | M'Sadoques |
| 7,307,429 | B1 | 12/2007 | Parker et al. |
| 7,342,474 | B2 | 3/2008 | Castonguay et al. |
| 7,378,927 | B2 | 5/2008 | DiSalvo et al. |
| 7,414,499 | B2 | 8/2008 | Germain |
| 7,595,710 | B2 | 9/2009 | DeBoer et al. |
| 7,598,629 | B2 | 10/2009 | Brown et al. |
| 7,876,181 | B2 | 1/2011 | Nakano |
| 8,120,886 | B2 | 2/2012 | Anand et al. |
| 8,437,112 | B2 | 5/2013 | Wan et al. |
| 8,451,568 | B2 | 5/2013 | Wan et al. |
| 8,570,713 | B2 | 10/2013 | Kumfer et al. |
| 9,042,073 | B2 | 5/2015 | Mills et al. |
| 9,048,054 | B2 | 6/2015 | Potratz |
| 9,312,088 | B2 | 4/2016 | Sorenson, Sr. |
| 9,318,284 | B2 | 4/2016 | Fasano |
| 9,324,513 | B2 | 4/2016 | Cazals |
| 9,384,931 | B2 | 7/2016 | Fasano |
| 9,799,476 | B2 | 10/2017 | Fasano |
| 9,859,084 | B2 | 1/2018 | Fasano et al. |
| 9,966,206 | B1 | 5/2018 | Sastry et al. |
| 10,361,043 | B2 | 7/2019 | Okerman |
| 10,651,681 | B2 | 5/2020 | Sorenson |
| 10,855,067 | B2 | 12/2020 | Murahari et al. |
| 11,342,152 | B2 * | 5/2022 | Ostrovsky .............. H01H 33/02 |
| 11,398,363 | B2 | 7/2022 | Courson et al. |
| 11,901,148 | B2 | 2/2024 | Kamor et al. |
| 2003/0123209 | A1 | 7/2003 | Kim |
| 2005/0024173 | A1 | 2/2005 | Puskar et al. |
| 2005/0212628 | A1 | 9/2005 | Castonguay et al. |
| 2005/0212629 | A1 | 9/2005 | Williams et al. |
| 2005/0213289 | A1 | 9/2005 | M'Sadoques et al. |
| 2006/0071742 | A1 | 4/2006 | Castonguay et al. |
| 2007/0132531 | A1 | 6/2007 | Elms |
| 2008/0151463 | A1 | 6/2008 | Dwyer et al. |
| 2009/0167100 | A1 | 7/2009 | Brown et al. |
| 2010/0020453 | A1 | 1/2010 | McCoy et al. |
| 2010/0052829 | A1 | 3/2010 | Anand et al. |
| 2011/0273817 | A1 | 11/2011 | Wan |
| 2011/0273818 | A1 | 11/2011 | Wan et al. |
| 2012/0273334 | A1 | 11/2012 | Ganley |
| 2013/0003262 | A1 | 1/2013 | Kumfer et al. |
| 2014/0062623 | A1 | 3/2014 | Fasano |
| 2014/0176293 | A1 | 6/2014 | Melecio |
| 2015/0035628 | A1 | 2/2015 | Warne |
| 2015/0070114 | A1 | 3/2015 | Fasano et al. |
| 2015/0101914 | A1 | 4/2015 | Sorenson |
| 2016/0141862 | A1 | 5/2016 | Endozo et al. |
| 2016/0163475 | A1 | 6/2016 | Okerman |
| 2016/0300682 | A1 | 10/2016 | Fasano |
| 2019/0058354 | A1 | 2/2019 | Sorenson |
| 2019/0189379 | A1 | 6/2019 | Ostrovsky et al. |
| 2020/0136365 | A1 | 4/2020 | Courson et al. |

FOREIGN PATENT DOCUMENTS

| | | | |
|---|---|---|---|
| EP | 1703533 | A2 | 9/2006 |
| EP | 2849200 | A1 | 3/2015 |
| WO | 02080329 | A1 | 10/2002 |
| WO | 2004044937 | A2 | 5/2004 |
| WO | 2008010038 | A2 | 1/2008 |

OTHER PUBLICATIONS

Search Report dated Sep. 29, 2019 corresponding to Chinese Patent Application No. 201780049007.4.

International Search Report dated Dec. 11, 2017 corresponding to Int'l Patent Application PCT/US2017/045651.

Written Opinion of the International Searching Authority issued by the International Searching Authority/US, in connection to International Application No. PCT/US20/70839 dated Feb. 12, 2021.

International Search Report issued by the International Searching Authority/US in connection to International Application No. PCT/US20/70839, dated Feb. 12, 2021.

International Search Report and Written Opinion issued by the European Patent Office in connection with International Application No. PCT/US2022/015201, dated Jul. 11, 2022.

* cited by examiner

CIRCUIT BREAKERS INCORPORATING RESET LOCKOUT MECHANISMS

CROSS-REFERENCE TO RELATED APPLICATIONS

This application is a continuation of U.S. patent application Ser. No. 18/112,873 filed Jan. 22, 2023, which is a divisional of U.S. patent application Ser. No. 16/707,535 filed Dec. 9, 2019, now U.S. Pat. No. 11,610,751, which corresponds to International PCT Application No. PCT/US2020/070839 filed Dec. 2, 2020, the disclosures of which are incorporated herein by reference in their entirety.

TECHNICAL FIELD

The present disclosure relates to an electrical switching apparatus and, more particularly, but not exclusively, relates to circuit breakers, including a reset lockout mechanism engaged by a single actuator, such as a rocker.

BACKGROUND

The electrical wiring device industry has witnessed an increasing call for circuit interrupting devices or systems which are designed to protect from dangers presented by overcurrent (e.g., overload/short circuits), ground faults, and arc faults. In particular, electrical codes require electrical circuits in home bathrooms and kitchens to be equipped with ground fault circuit protection. For instance, GFCI devices are resettable after they are tripped by, for example, the detection of a ground fault. A test button can be used to test the circuitry and trip mechanism used to sense faults. A reset button can be used to reset the electrical connection between input and output conductive paths. Certain resettable circuit interrupting devices are capable of locking out the reset portion of the device if the circuit interrupting portion is non-operational or if an open neutral condition exists. Existing resettable circuit breakers that offer fault protection capabilities have line phase and neutral terminals as well as load phase and neutral terminals. Additionally, resettable circuit breakers also have a switch for controlling power distribution to the load phase terminal. To provide fault protection, such circuit breakers have sensing circuitry, which is capable of sensing faults (e.g., ground faults). The circuitry may be coupled to an actuator (e.g. an electromechanical actuator or a solenoid) such that upon sensing a fault, the circuit may cause the actuator to open the switch.

SUMMARY

Existing challenges associated with the foregoing, as well as other challenges, are overcome by systems and methods which operate in accordance with the present disclosure.

According to one aspect, this disclosure is directed to a circuit breaker. The circuit breaker includes a line phase terminal, a load phase terminal, a line neutral terminal, a conductive path formed between the line phase terminal and the load phase terminal, the conductive path having an open configuration and closed configuration, a sensor, a linkage configured to move the conductive path between the open configuration and the closed configuration, a rocker selectively engageable with the linkage, the rocker configured to move the linkage between an open position and a closed position, and an arm selectively engageable with the rocker, the arm to prevent the conductive path from moving to the closed configuration unless the circuit breaker passes a self-test when movement of the rocker is detected. A trip operation of the circuit breaker includes a time delay based upon an amount of current on the conductive path detected by the sensor.

In embodiments, the circuit breaker further includes a controller, wherein the line phase terminal is in electrical communication with the controller when the conductive path is in the open configuration.

In embodiments, the controller is configured to log an operation of the circuit breaker as an event.

In embodiments, the event comprises a reset operation of the circuit breaker.

In embodiments, the sensor is configured to sense a ground fault.

In embodiments, the sensor is configured to sense an arc fault.

In embodiments, the sensor is a current sensor configured to measure current flowing on the conductive path.

In embodiments, the relationship between the time delay and the amount of current detected is defined by at least one trip-time curve, and the at least one trip-time curve varies based on an operating mode of the circuit breaker operation.

In embodiments, the at least one trip-time curve comprises a plurality of trip-time curves.

In embodiments, the at least one trip-time curve is programmed for a particular user of one or more users, a particular circuit breaker of one or more circuit breakers.

According to another aspect, this disclosure is directed to a circuit breaker that includes a line phase terminal, a load phase terminal, a line neutral terminal, a conductive path formed between the line phase terminal and the load phase terminal, the conductive path having an open configuration and closed configuration, a sensor, a linkage configured to move the conductive path between the open configuration and the closed configuration, a switch spring, a rocker selectively engageable with the linkage, the rocker configured to move the linkage between an open position and a closed position, wherein the rocker further includes a finger operatively coupled to the switch spring to mechanically engage the switch spring, The switch spring is mechanically engaged, the circuit breaker is enabled to determine when a fault condition occurs, and an arm selectively engageable with the rocker, the arm configured to prevent the conductive path from moving to the closed configuration unless the circuit breaker passes a self-test when movement of the rocker is detected.

In embodiments, the switch spring is mechanically engaged during a portion of travel of the rocker.

In embodiments, the finger is located at a bottom side of the rocker, and the finger includes a switch engagement face that mechanically engages the switch spring.

In embodiments, wherein upon the circuit breaker being in a first state, the switch engagement face pushes a distal end of the switch spring to prevent the switch spring from being in electrical communication with the conductive path, and wherein upon the circuit breaker being in a second state, the switch engagement face releases the distal end of the switch spring to enable the switch spring to be in electrical communication with the conductive path.

In embodiments, the circuit breaker further includes a contact arm.

In embodiments, the contact arm is biased in a first position by a spring.

In embodiments, the contact arm includes a first contact to mechanically couple with a second contact.

In embodiments, wherein upon the rocker being in a first position, the first contact is mechanically uncoupled from the second contact.

In embodiments, the circuit breaker further includes a catch biased in a first position, wherein a downward force applied to the linkage rotates the contact arm and the catch.

The details of one or more aspects of this disclosure are set forth in the accompanying drawings and the description below. Other aspects, features, and advantages will be apparent from the description, the drawings, and the claims that follow.

BRIEF DESCRIPTION OF THE DRAWINGS

The accompanying drawings, which are incorporated in and constitute a part of this specification, illustrate embodiments of this disclosure and, together with a general description of this disclosure given above, and the detailed description of the embodiment(s) given below, serve to explain the principles of this disclosure, wherein.

Figure 1:
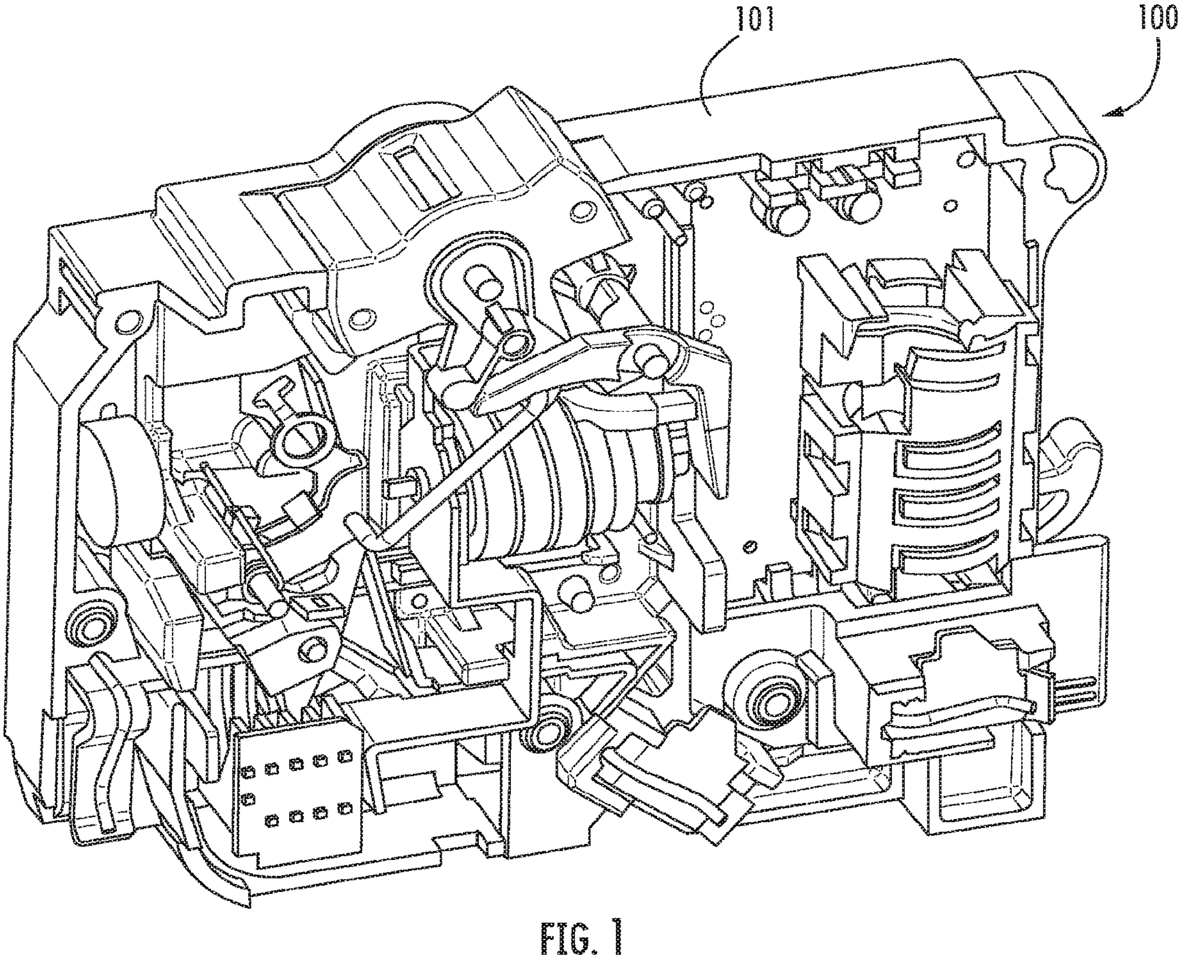
FIG. 1 is a perspective view showing internal components of an embodiment of a circuit breaker in accordance with the principles of this disclosure, the internal components including a reset lockout mechanism shown in a position corresponding to an OFF state of the circuit breaker.

The figures depict embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

The present disclosure relates to resettable circuit interrupting devices or circuit breakers for opening and closing electrical communication between line terminals (e.g., input) and load terminals (e.g., output) of a device. Electrical communication between the line and load terminals may be enabled by establishing a conductive path between the line and load terminals. The devices described herein may be of any suitable type such as, without limitation, ground fault circuit interrupters (GFCIs), arc fault circuit interrupters (AFCIs), ground fault protection equipment (GFPE), and suitable combinations thereof (e.g. AFCI/GFCI breakers). Generally, circuit interrupting devices according to the present disclosure include a circuit interrupter, a reset portion, a reset lockout mechanism, and a trip portion. It is contemplated that the circuit interrupter, reset portion, reset lockout mechanism and trip portion may be combined or otherwise implemented in a variety of ways without departing from the spirit or scope of the present disclosure.

The circuit breaker includes line side phase and neutral terminals as well as load side phase and neutral terminals. The line side phase terminal is capable of transmitting electrical power to the load side phase terminal when the line side phase terminal is in electrical communication with the load side phase terminal. Similarly, the line side neutral terminal is capable of transmitting electrical power to the load side neutral terminal when the line side neutral terminal is in electrical communication with the load side neutral terminal. The line side phase and neutral terminals connect to a power source, and the load side phase and neutral terminals connect to a branch circuit having one or more loads. These terminals may be, for example, any suitable electrical fastening devices, such as, but not limited to binding screws, lugs, binding plates, jaw contacts, pins, prongs, sockets, and/or wire leads, which secure conductive paths to the circuit breaker, as well as conduct electricity.

The circuit interrupting and reset portions generally use electromechanical component(s) to break and reestablish the conductive path between line and load phase terminals, and between line and load neutral terminals, respectively. Examples of such electromechanical components include solenoids, bimetallic components, hydraulic components, switches, relays, contactors, or any other suitable components capable of being electromechanically engaged so as to break or reestablish conductive paths between the line and load terminals. In some embodiments, circuit interrupters are separated in response to specific fault types, such as the presence of an overcurrent, a ground fault, an arc fault, or a combination thereof. Additionally, the same circuit interrupter may be used to protect against overcurrent, ground fault, arc fault conditions, or combinations thereof. Additionally, there may be individual circuit interrupters configured to react to overcurrent, ground fault, or arc fault protection, with the individual circuit interrupters configured to share certain components.

To protect against overcurrent, arc faults, and ground faults, the circuit interrupter breaks the electrical continuity between the line and load phase terminals by opening the circuit when a fault is detected. For example, at least one mechanical connection between components associated with the conductive paths may be removed.

Once the circuit interrupter breaks the conductive path, the reset lockout mechanism is configured to prevent the circuit breaker from resetting or reestablishing a continuous or closed conductive path while a predefined condition or fault exists. The reset lockout mechanism may be any lockout mechanism capable of preventing the reestablishment of the conductive path. For example, such mechanism can include mechanical and/or electrical components and/or a predefined routine performed by a control circuit that functions to prevent the conductive path from reestablishing. For instance, one or more of the mechanical components of the circuit breaker can transition to a position in which the circuit breaker is in an OFF state where such components are positioned to lock out one or more components of the circuit breaker to prevent the conductive path from being reestablished.

Various types of circuit interrupting devices are contemplated by the present disclosure. Generally, circuit breakers are used as resettable branch circuit protection devices that are capable of opening conductive paths supplying electrical power between line and load terminals in a power distribution system (or sub-system). The conductive paths transition from a CLOSED configuration (e.g., ON) to an OPEN configuration (e.g., OFF), for example, if a fault is detected or if the current rating of the circuit breaker is exceeded. Detection of faults may be performed by mechanical components and/or electrical components. Once a detected fault is cleared, the circuit breaker may be reset to enable reestablishment of the conductive path.

The circuit breakers can provide fault protection for various types of faults or a combination of such faults. Faults can include conditions that render the circuit unsafe due to the presence of an abnormal electric current and/or voltage. Examples of faults contemplated include, without limitation, ground faults, arc faults, immersion detection faults, appliance leakage faults, and equipment leakage faults. Although various types of fault protection circuit breakers are contemplated, for purposes of clarity, the following descriptions will be made with reference to GFCI circuit breakers and AFCI circuit breakers.

An exemplary embodiment of a GFCI circuit breaker incorporating a reset lockout mechanism will now be described. Generally, each GFCI circuit breaker has a circuit interrupter, a reset portion, a reset lockout mechanism for selectively locking the circuit breaker in either an OFF or MID-TRIP state. Each GFCI circuit breaker may further include a trip portion which operates independently of the circuit interrupter. The trip portion may selectively transition the circuit breaker into a MID-TRIP state.

In the GFCI circuit breaker, the circuit interrupting and reset portions may include electromechanical components configured to selectively open or break and/or close or reestablish conductive paths between the line and load phase terminals. Additionally, or alternatively, components such as solid-state switches or supporting circuitry may be used to break or reestablish the conductive path. The circuit interrupter automatically breaks electrical continuity along the conductive path (e.g., opens the conductive path) between the line and load phase terminals upon detection of a ground fault, overcurrent, or arc fault, or any combination thereof. The reset portion enables reestablishing electrical continuity along the conductive path between the line phase terminal and the load phase terminal. The reset portion also enables reestablishing electrical continuity along the conductive path between the line neutral terminal and the load neutral terminal. In embodiments, the reset portion may cause the reset lockout mechanism to transition to a MID-TRIP position that corresponds to the MID-TRIP state of the circuit breaker. Operation of the reset portion and reset lockout mechanism may occur in conjunction with operation of the circuit interrupter so that the conductive path between the line and load phase terminals cannot be reestablished if the circuit interrupter is non-operational or if a fault is detected.

Particular embodiments of the present disclosure are described herein with reference to the accompanying drawings. However, it is to be understood that the disclosed embodiments are merely exemplary embodiments of the present disclosure and may be embodied in various forms. Well-known functions or constructions are not described in detail so as to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

For the purposes of promoting an understanding of the principles of the present disclosure, reference will now be made to particular embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the spirit and scope of the present disclosure.

Figure 2:
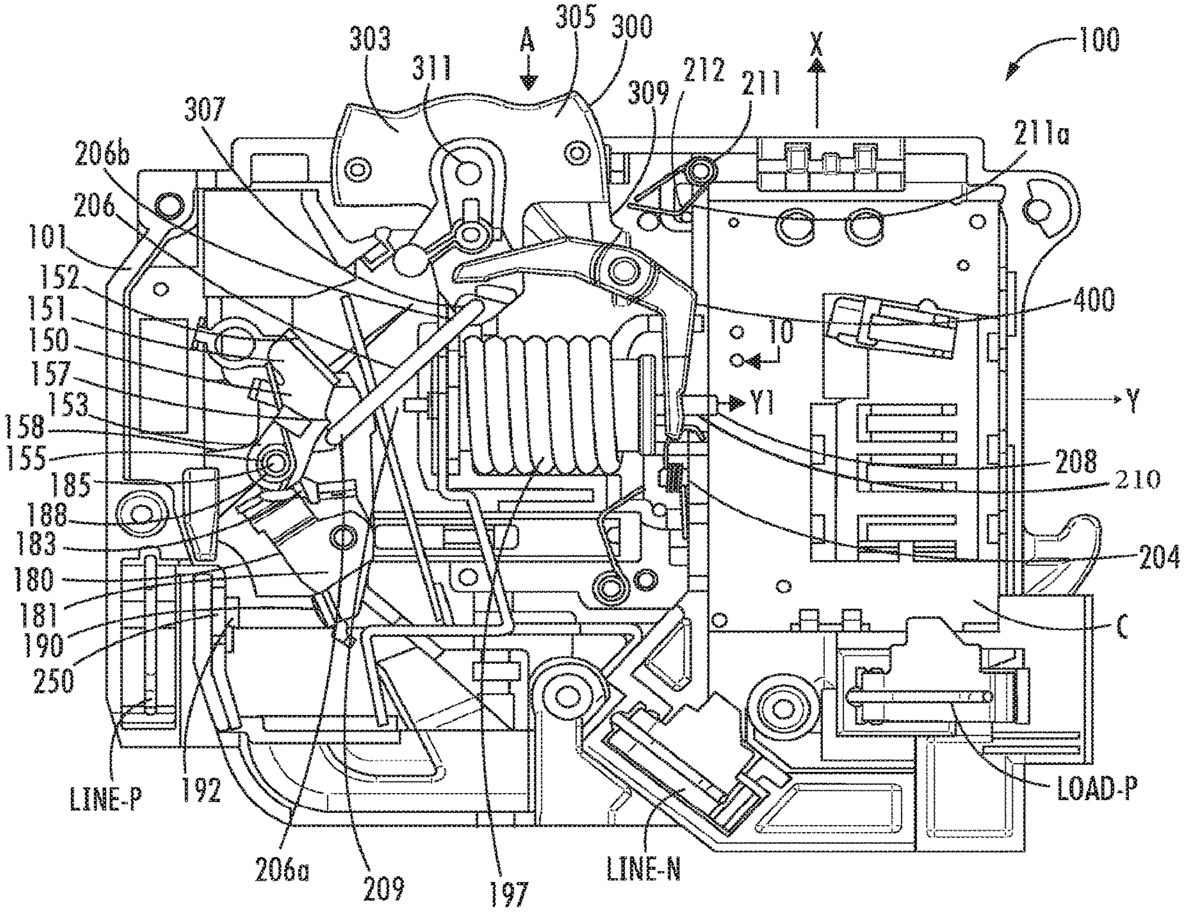
FIG. 2 is a side view of the internal components of the circuit breaker of FIG. 1 with the reset lockout mechanism shown in a position corresponding to an ON state of the circuit breaker.

With reference to FIGS. 1 and 2, a circuit breaker 100 of this disclosure generally includes a housing 101 and a reset lockout mechanism 10 disposed within the housing 101. The reset lockout mechanism 10 is configured to mechanically prevent the circuit breaker 100 from being switched to the ON state when a fault condition occurs, or to mechanically enable the circuit breaker 100 to be switched to the ON state when no fault condition is present (e.g., being switched from the OFF state). The housing 101 defines an axis "X" and an axis "Y" that are perpendicular to one another.

Figure 25:
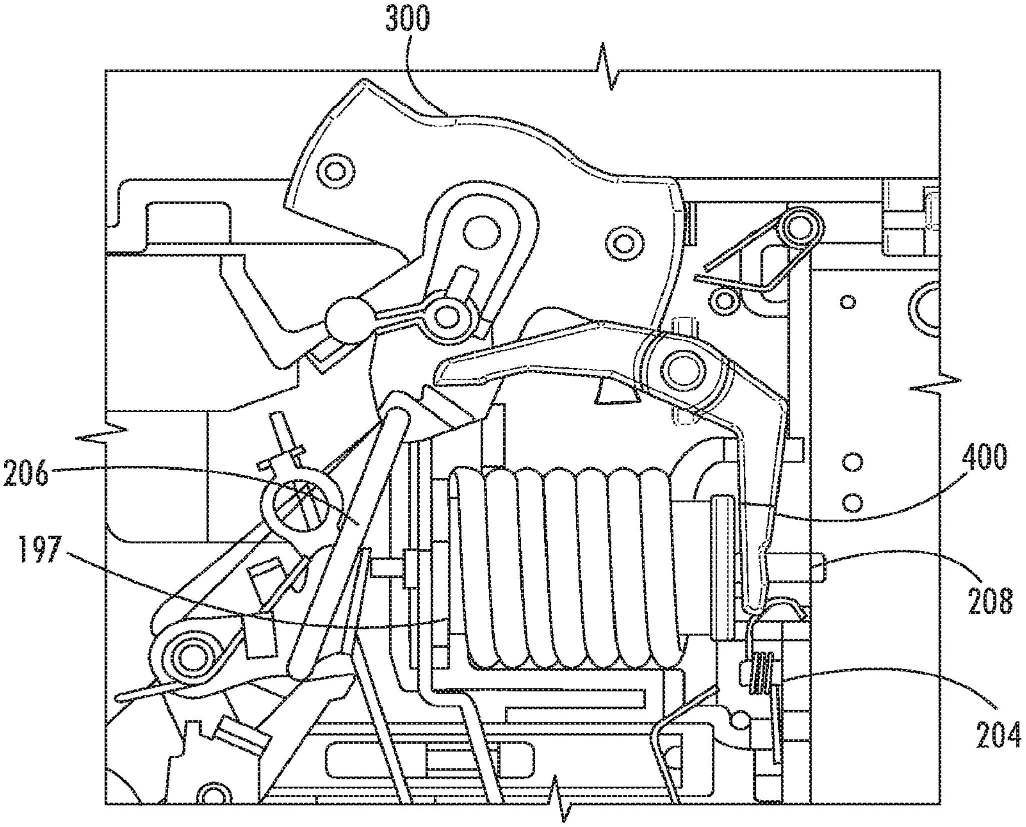
Figure 26:
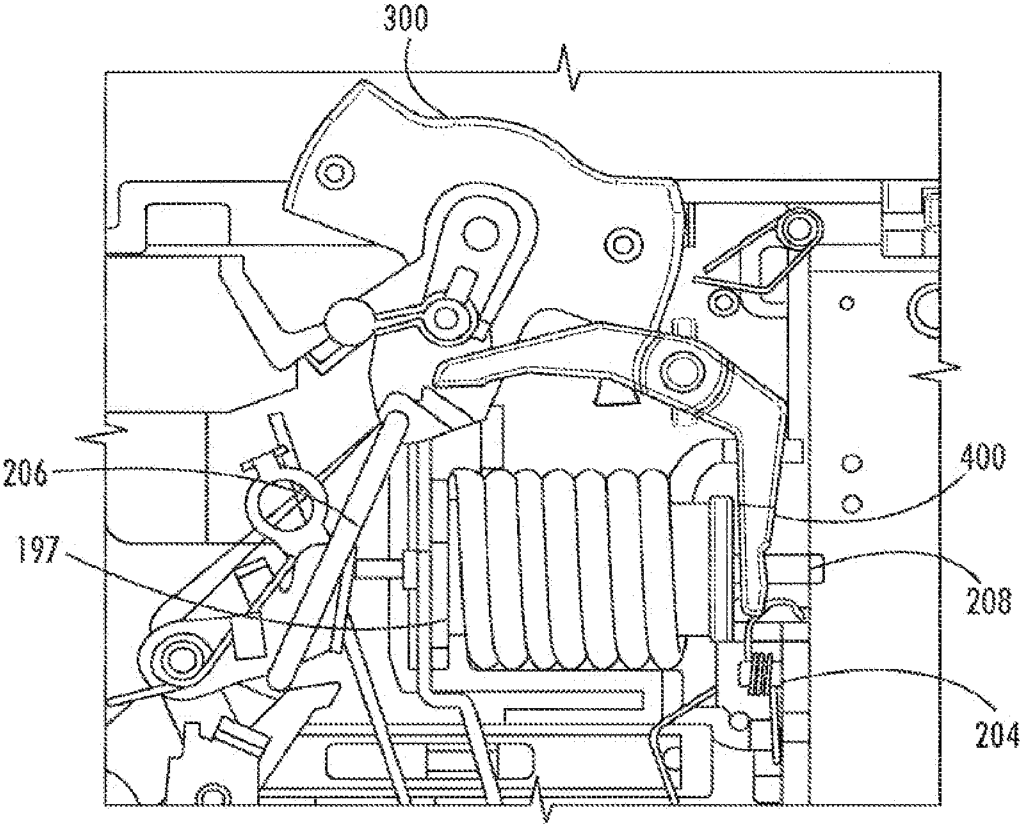
FIGS. 26-29 are progressive views illustrating movement of the reset lockout mechanism between positions corresponding to the ON state and the OFF state of the circuit breaker.
Figure 27:
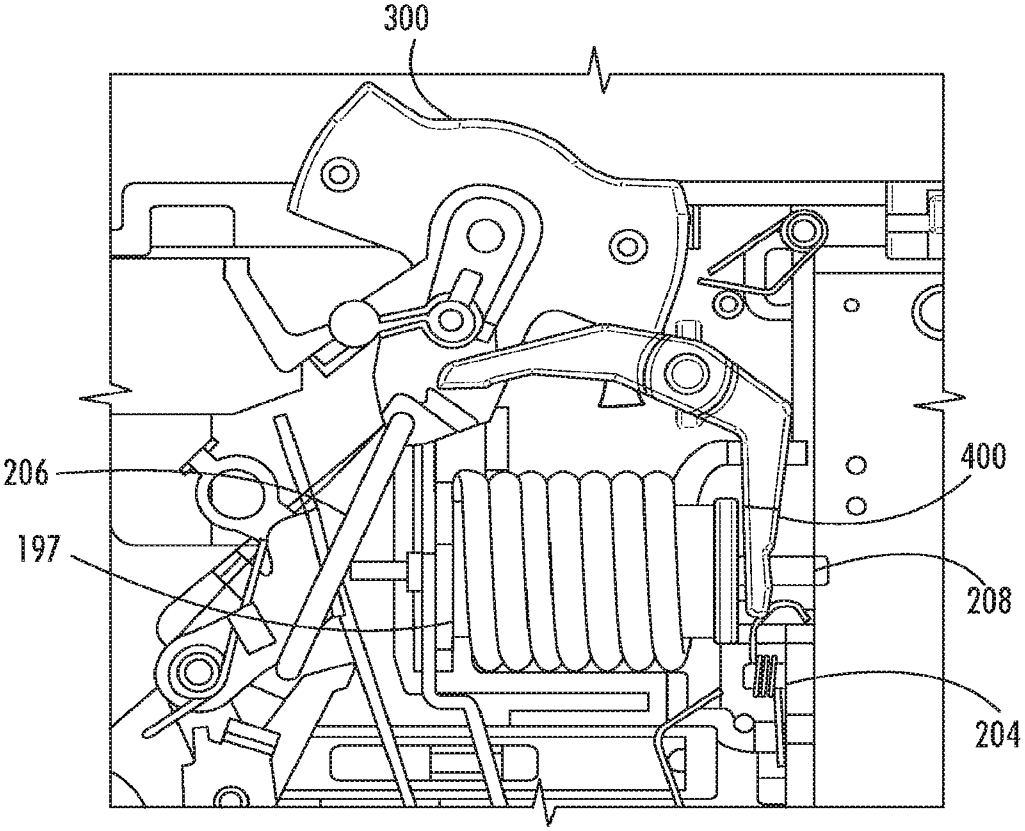
Figure 28:
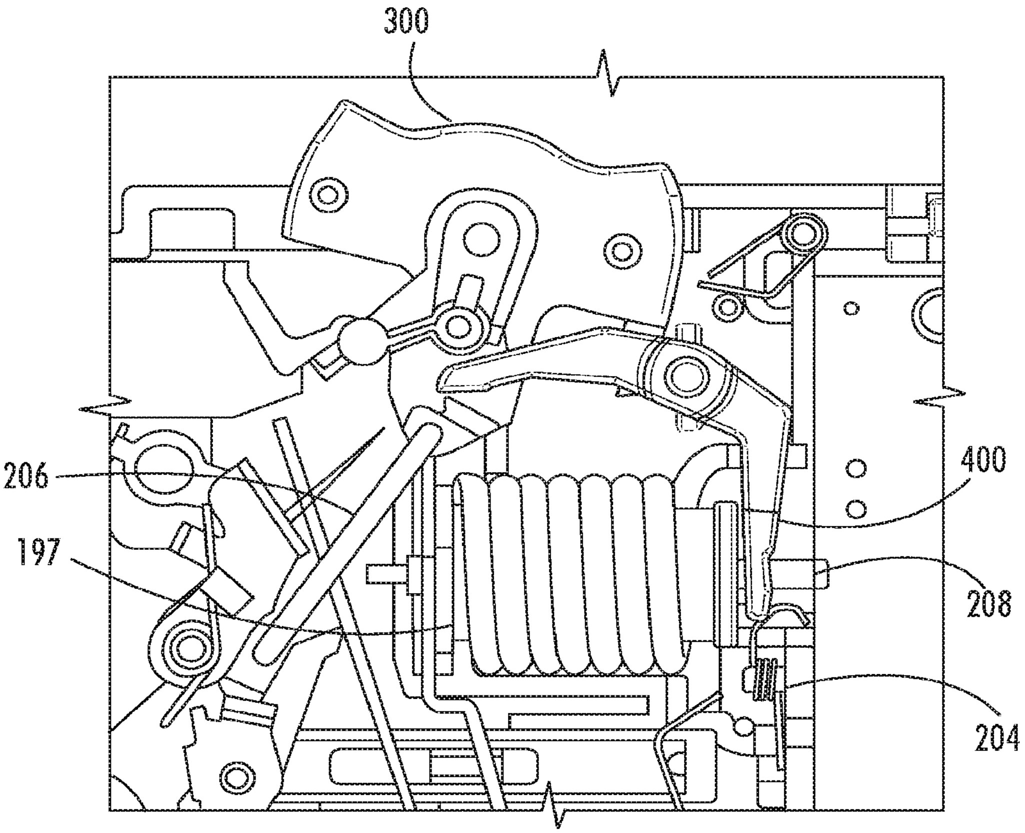
Figure 29:
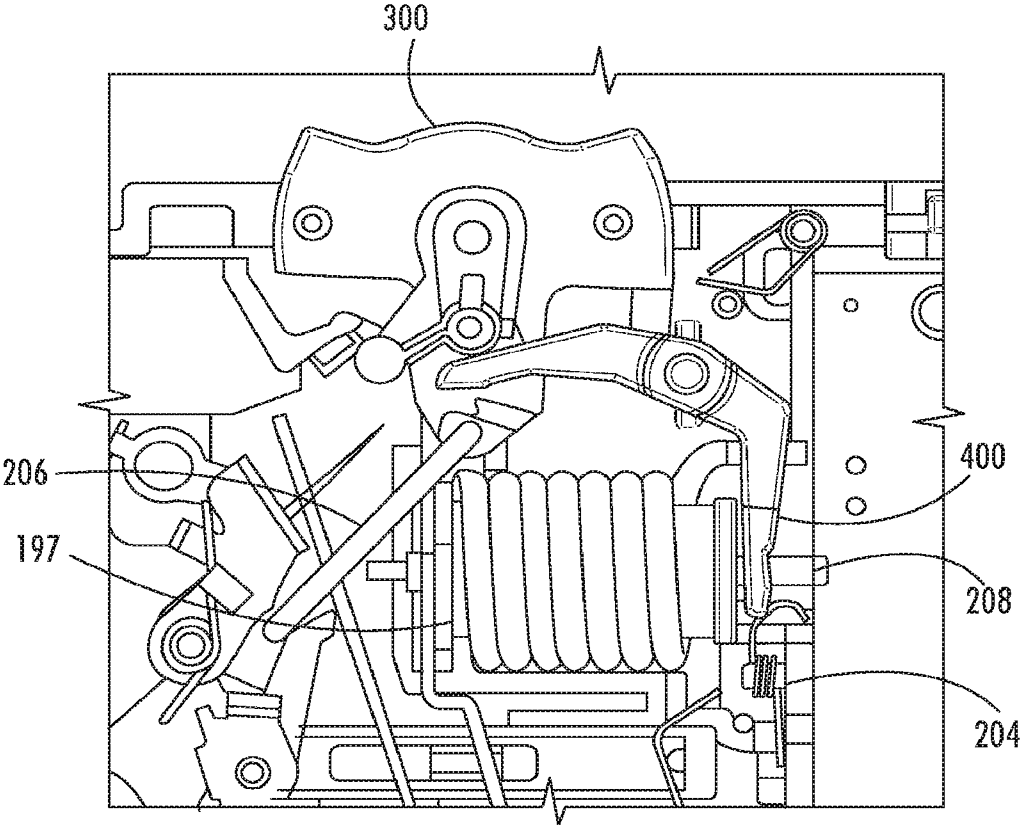
Figure 30:
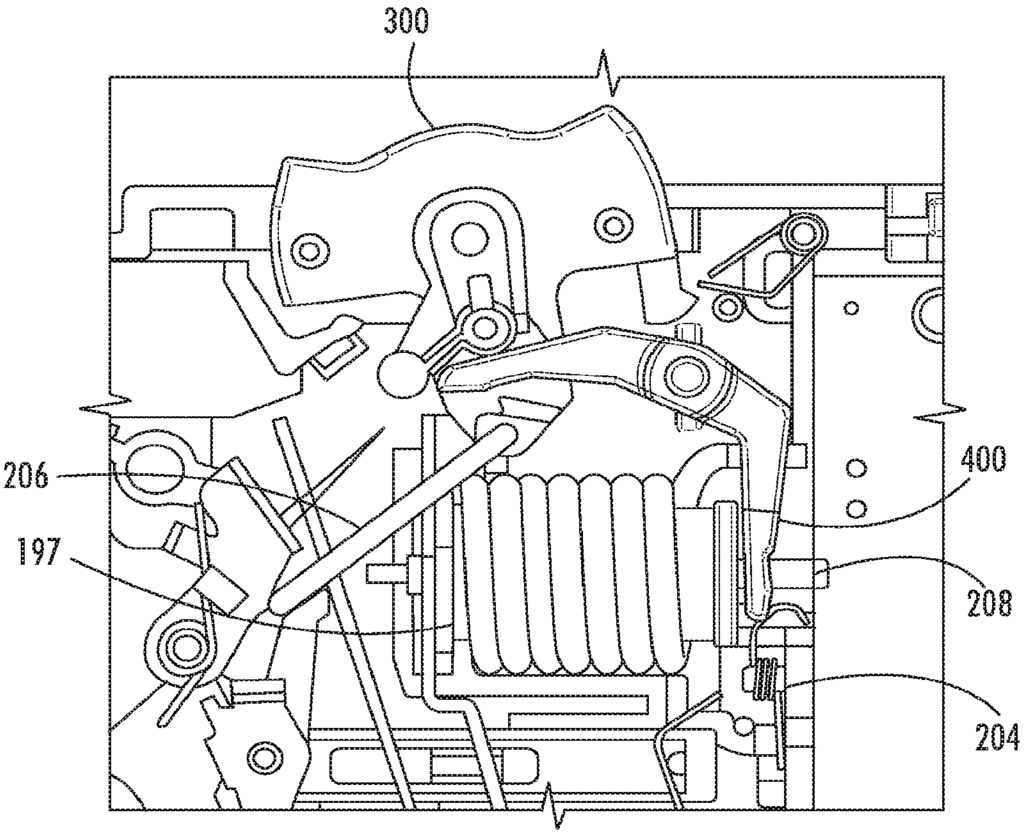
FIGS. 30-34 are progressive views illustrating movement of the reset lockout mechanism between positions corresponding to a MID-TRIP state and the OFF state of the circuit breaker.
Figure 31:
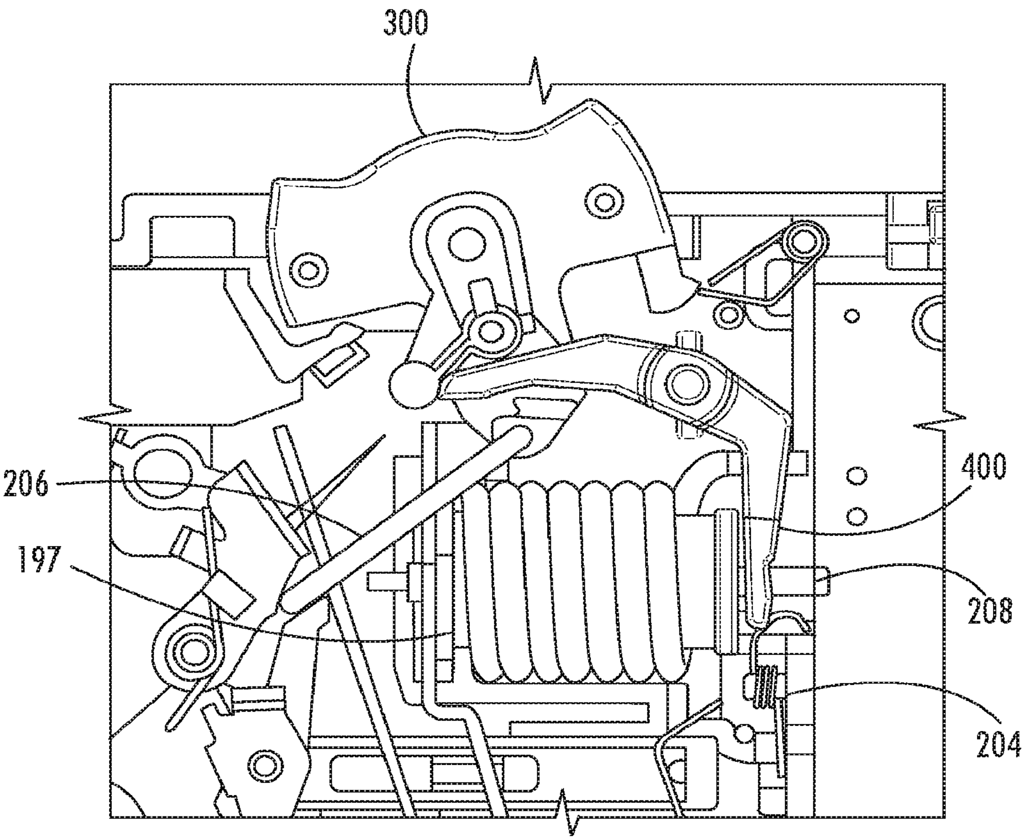
Figure 32:
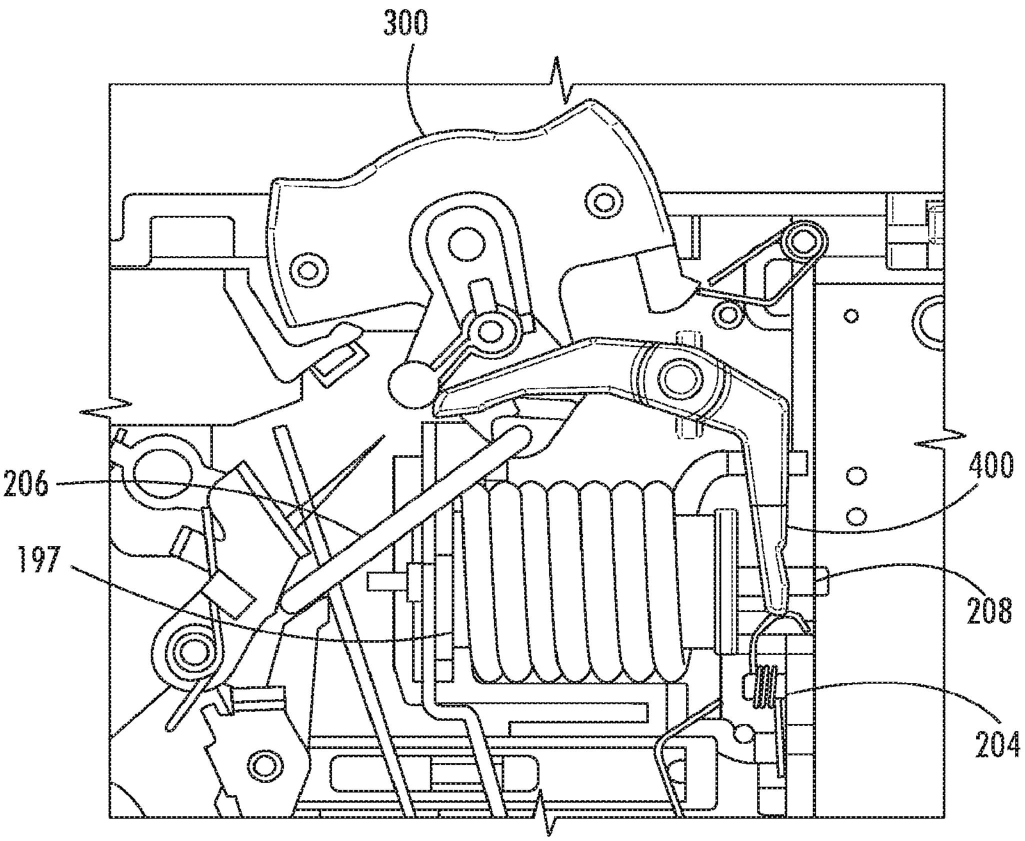
Figure 33:
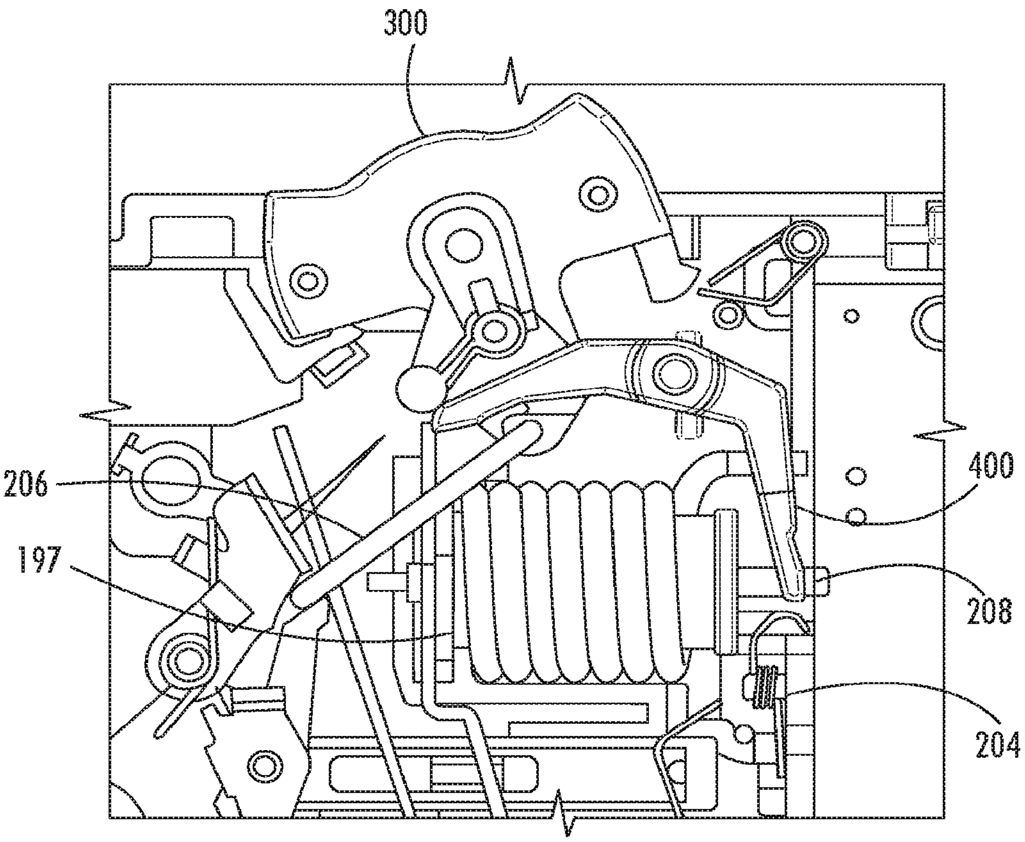

The reset lockout mechanism 10 generally includes a rocker 300, an armature 400, a solenoid 197, a plunger 208, a detent spring 204, and a linkage 206. The rocker 300 of the reset lockout mechanism 10 is disposed partially within the housing 101 of the circuit breaker 100 and is positioned to transition between an OFF position (see FIG. 15), corresponding to the OFF state of the circuit breaker 100, and an ON position (see FIG. 25), corresponding to the ON state of the circuit breaker 100. When the circuit breaker 100 is in the OFF state, a line phase terminal "LINE-P" and line neutral terminal "LINE-N" are not in electrical communication with a load phase terminal "LOAD-P" and a load neutral terminal "LOAD-N," respectively (the load neutral terminal is not shown). For purposes of clarity, unless explicitly stated, the line phase terminal "LINE-P" and line neutral terminal "LINE-N" will collectively be referred to as a line terminals "LINE-T," and similarly the load phase terminal "LOAD-P" and load neutral terminal "LOAD-N" will collectively be referred to as a load terminals "LOAD-T." Thus, when the circuit breaker 100 is in the OFF state, the line terminal "LINE-T" and the load terminal "LOAD-T" are not in electrical communication. Alternatively, when the circuit breaker 100 is in an ON state, the line and load terminals "LINE-T," "LOAD-T" are mechanically coupled via the conductive path, enabling transmission of electrical power therebetween.

The rocker 300 partially extends outward through housing 101 of the circuit breaker 100 and is configured for user access for manually operating the circuit breaker 100. The rocker 300 is pivotably coupled to the housing 101 about a pivot pin 311.

Figure 3:
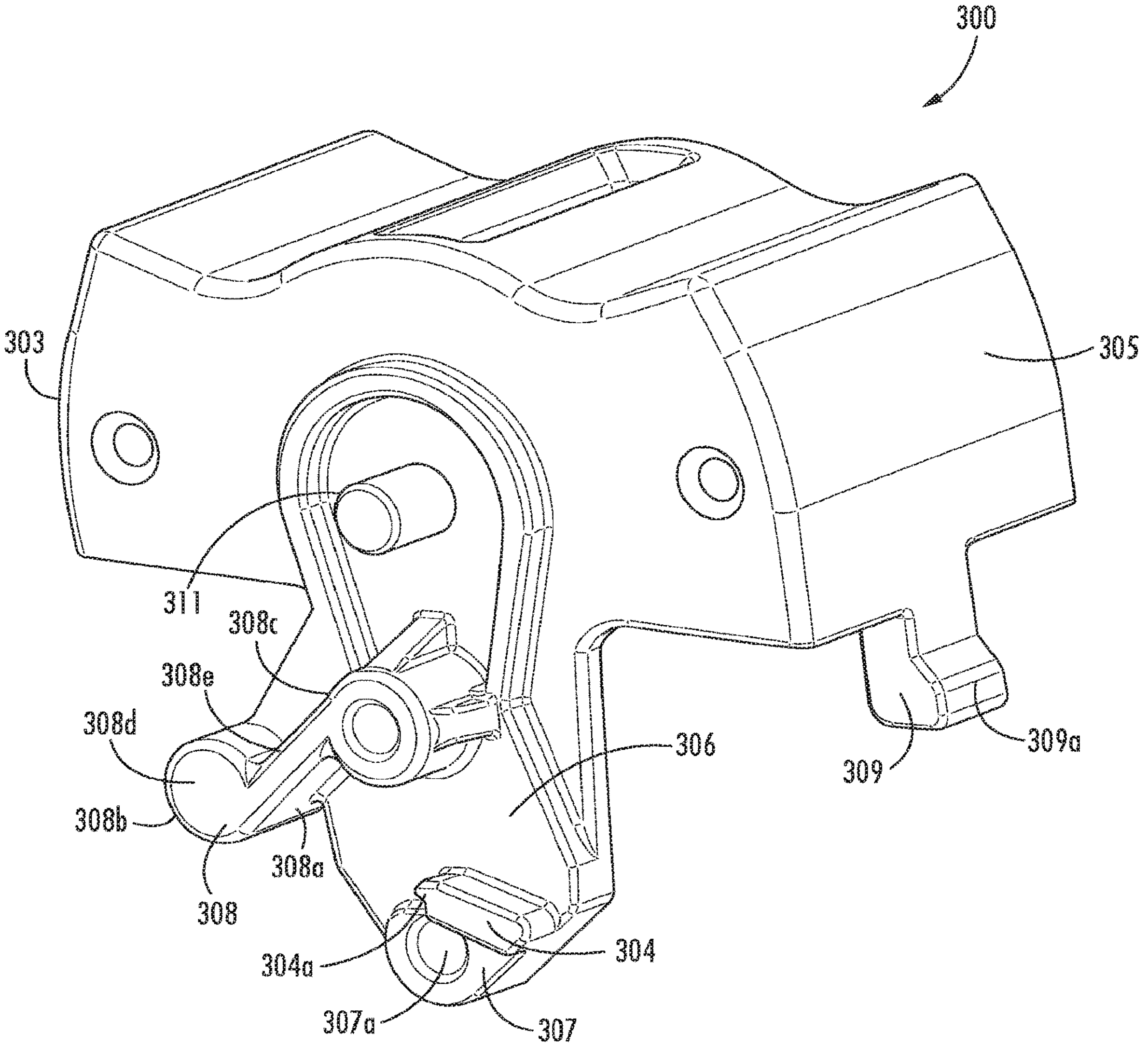
FIG. 3 is an enlarged perspective view of a rocker of the reset lockout mechanism.

With reference to FIG. 3, the rocker 300 has a body 306, including a first side 303 and a second side 305. The first side 303 is associated with an OFF position of the rocker 300 (when the rocker 300 is rotated counterclockwise in FIG. 3 towards the housing 101), and more generally, the OFF state of the circuit breaker 100. The second side 305, is associated with an ON position of the rocker 300 (when the rocker 300 is rotated clockwise in FIG. 3 towards the housing 101), and more generally, the ON state of the circuit breaker 100. The second side 305 of the rocker 300 includes a finger 309 configured to mechanically engage a switch spring 211 (FIG. 2) to enable the controller "C" of the circuit breaker 100 to determine when a fault condition occurs. The finger 309 is located towards the bottom of the second side 305 of the rocker 300. The outer surface of the finger 309 includes a switch engagement face 309*a* configured to mechanically engage the switch spring 211. The switch engagement face 309*a* projects outwardly from the finger 309 and has a curved configuration, although any suitable geometric configuration may be provided.

The body 306 of the rocker 300 includes a strike arm 308, a lock nub 304, and a bottom extension 307 defining a hole 307*a*. The strike arm 308 is configured to mechanically engage the armature 400 during a fault condition. The outer surface of the strike arm 308 includes a first barrel 308*b*, a second barrel 308*c*, a top face 308*d*, an armature engagement face 308*a*, and a side face 308*e*. The armature engagement face 308*a* is configured to mechanically engage the armature 400 during a fault condition.

The lock nub 304 is configured to mechanically engage the armature 400 to prevent the rocker 300 from moving in a direction "A" before it is determined that the breaker is operational. The outer surface of the lock nub 304 includes an outer surface having a curved engagement face 304*a*, although the engagement face 304*a* may have any suitable geometric configuration.

The finger 309 is operatively coupled to switch spring 211 (FIG. 2) during a portion of the travel of the rocker 300. Switch spring 211 is configured to make electrical contact with conductive member 212 to enable the controller "C" of the circuit breaker 100 to determine when a fault condition occurs. As seen in FIG. 2, the rocker bottom extension 307 is operatively coupled to a first end 206*b* of a linkage 206 having the first end 206*b* and a second end 206*a*. The linkage 206 is disposed in the housing 101 and is configured to enable the conductive path to move between an OPEN configuration and a CLOSED configuration for transitioning the circuit breaker 100 between the open and closed states.

Figure 40:
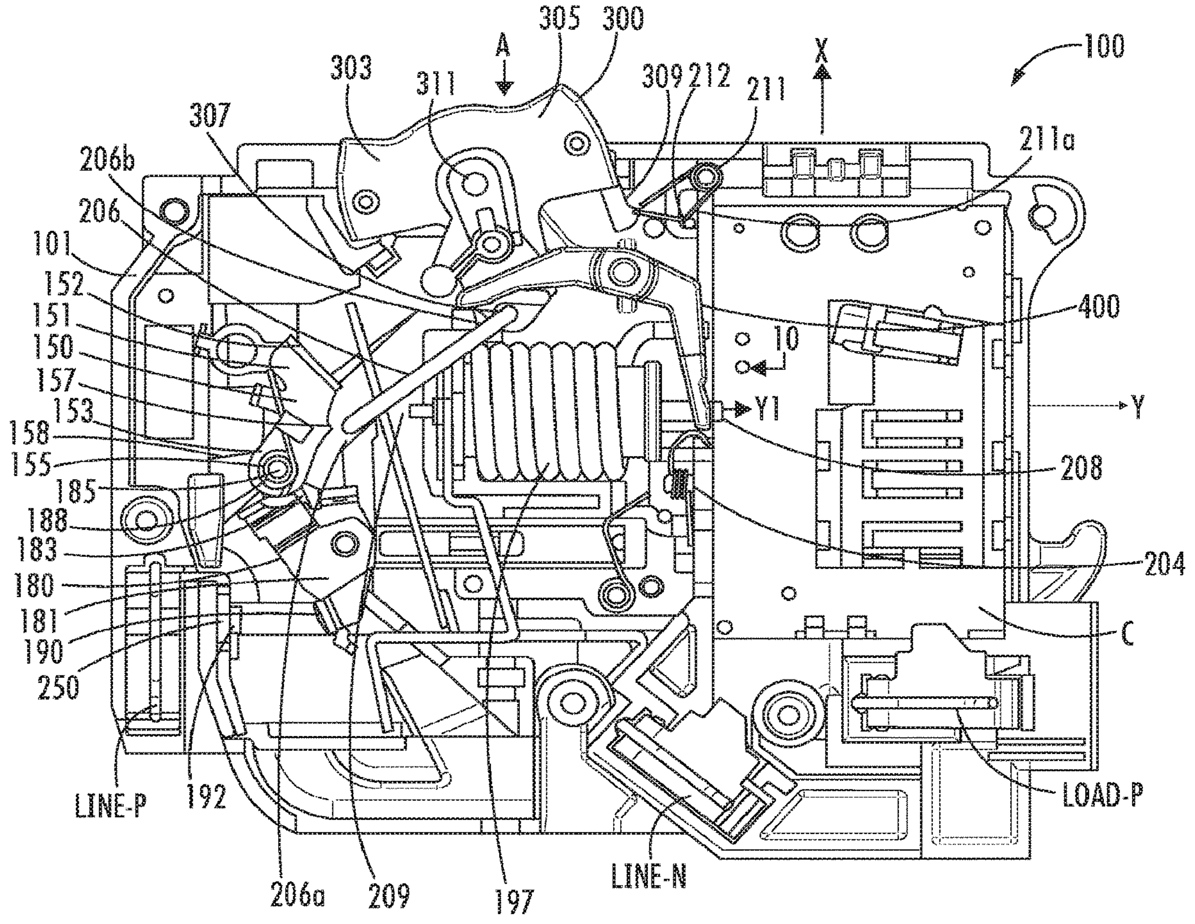
FIG. 40 is a side view of the internal components of the circuit breaker of FIG. 1 with the reset lockout mechanism shown in a position corresponding to the OFF state of the circuit breaker.

When the circuit breaker 100 is in the OFF state (FIG. 40), switch engagement face 309*a* of rocker 300 pushes a distal end 211*a* of switch spring 211 and prevents switch spring 211 from making electrical contact with conductive member 212. When the circuit breaker 100 is not in the OFF state (e.g., the ON state or MID-TRIP state), switch engagement face 309*a* releases the distal end 211*a* of switch spring 211 and enables switch spring 211 to make electrical contact with conductive member 212. When the circuit breaker 100 is in the OFF state, first and second contacts 190, 192 of a contact arm 180 are in an OPEN position (e.g., not physically touching) such that the reset lockout mechanism 10 is engaged and prevents reestablishment of a conductive path between the line terminal "LINE-T" and the load terminal "LOAD-T." During motion of the rocker 300 from the OFF position to the ON position thereof, the reset lockout mechanism 10 becomes engaged such that the reset lockout mechanism 10 requires clearance (e.g., disengagement thereof) during the travel of the rocker 300 in order to enable the rocker 300 to be disposed in the ON position thereof. More particularly, when the reset lockout mechanism 10 is engaged, the circuit breaker 100 is prevented from returning to the ON state until a controller "C" of the circuit breaker 100 determines that the components of the circuit interrupter, including a solenoid 197, are operational. The reset lockout mechanism 10 should become disengaged (e.g., cleared), based on controller "C" determining the absence of a fault condition, during the rocker's 300 travel (e.g., in the "A" direction") to get to the ON state of the circuit breaker 100.

Figure 19:
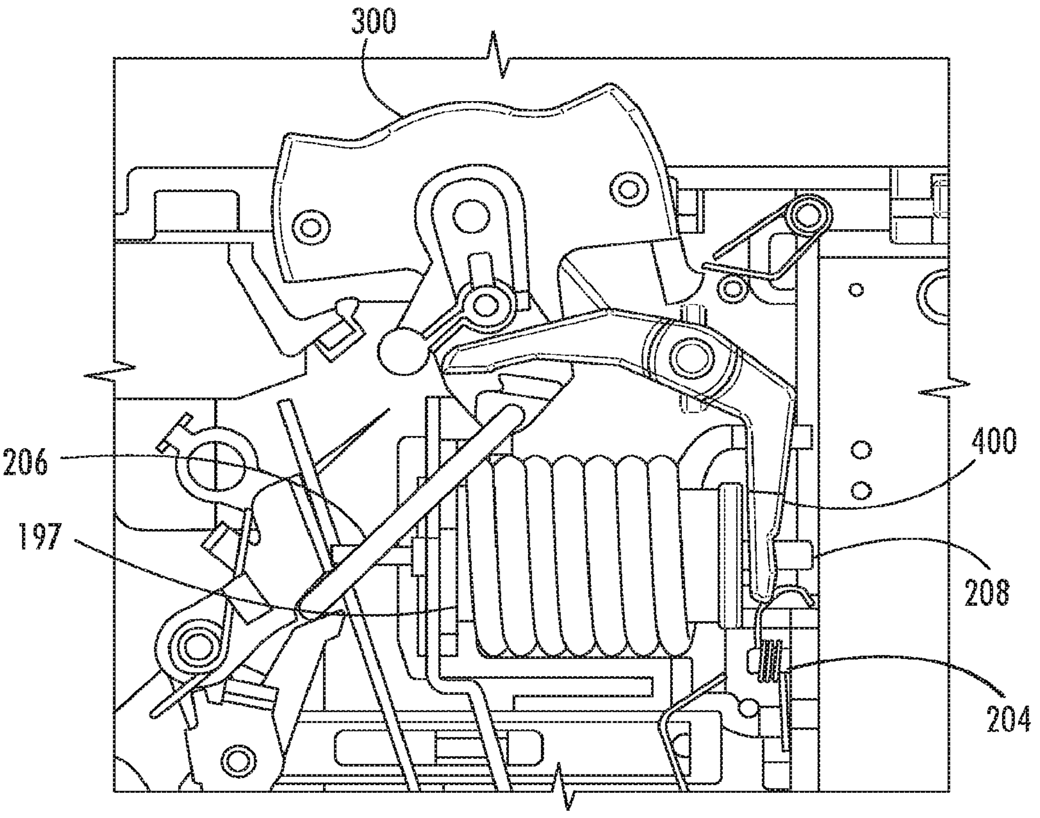
Figure 20:
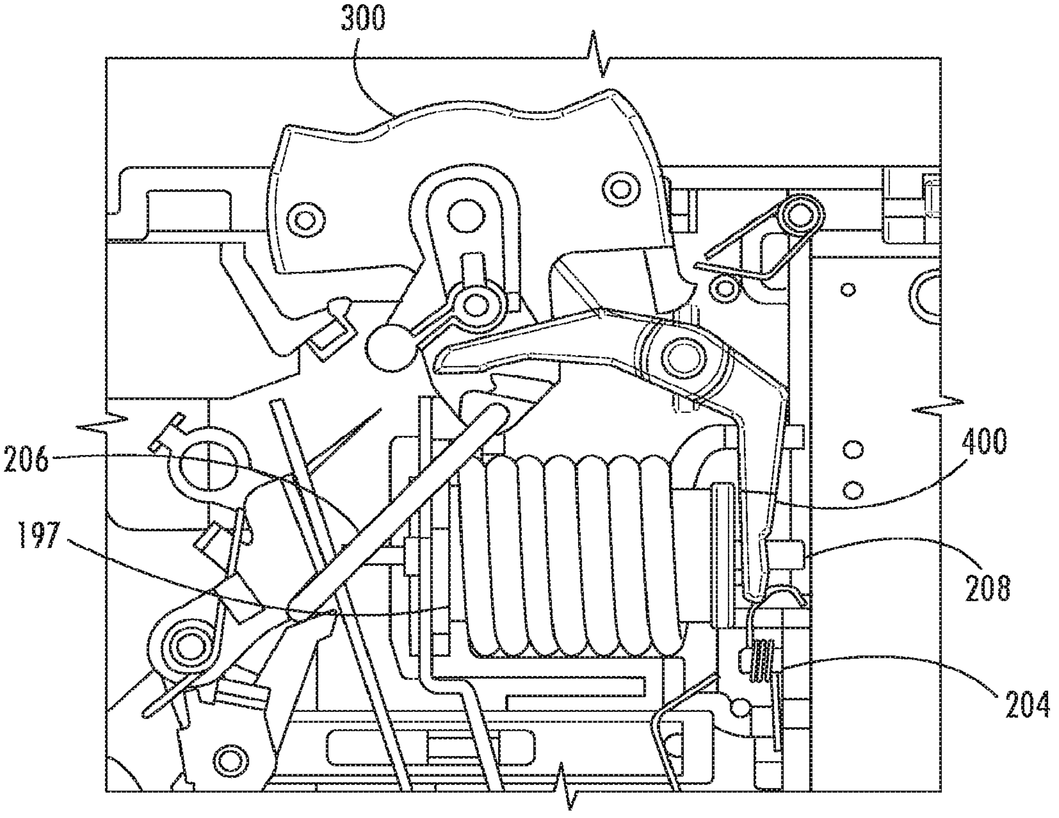
Figure 21:
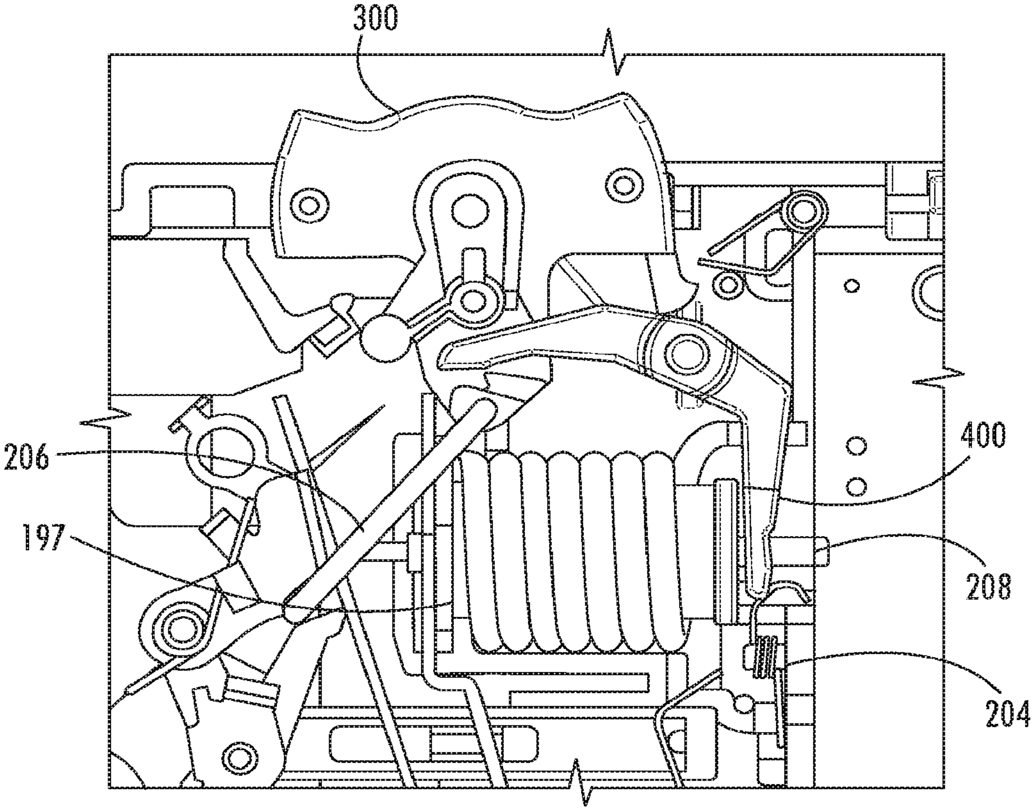
Figure 22:
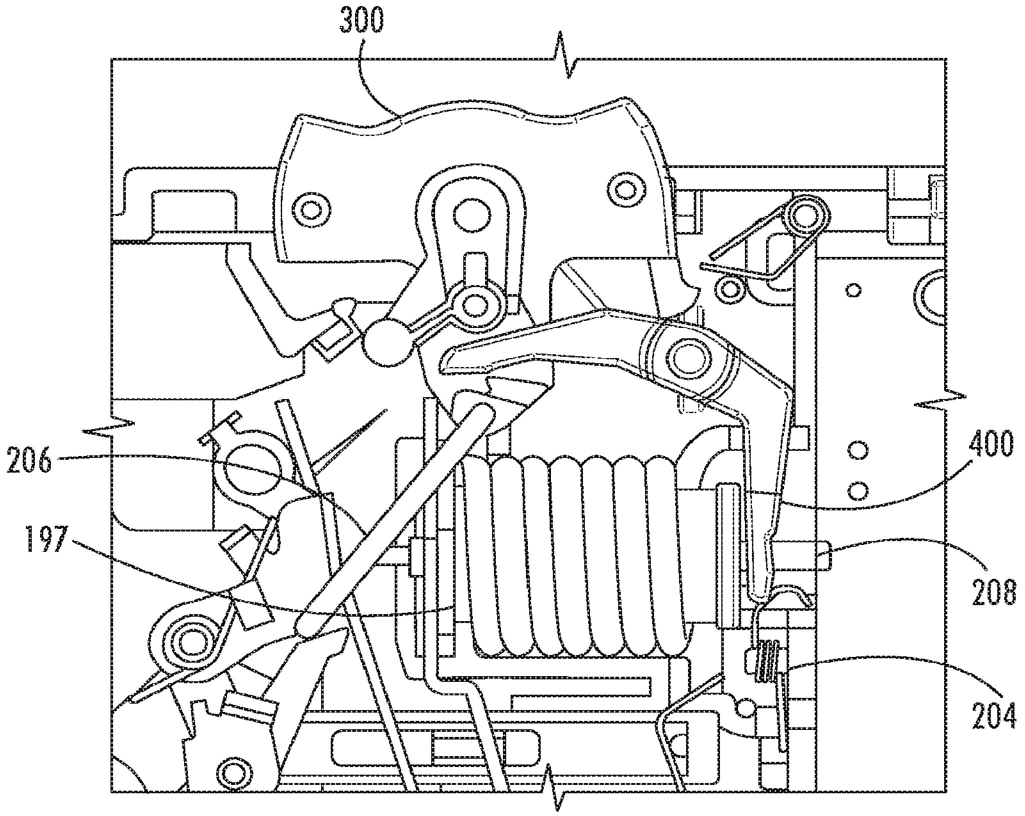
Figure 23:
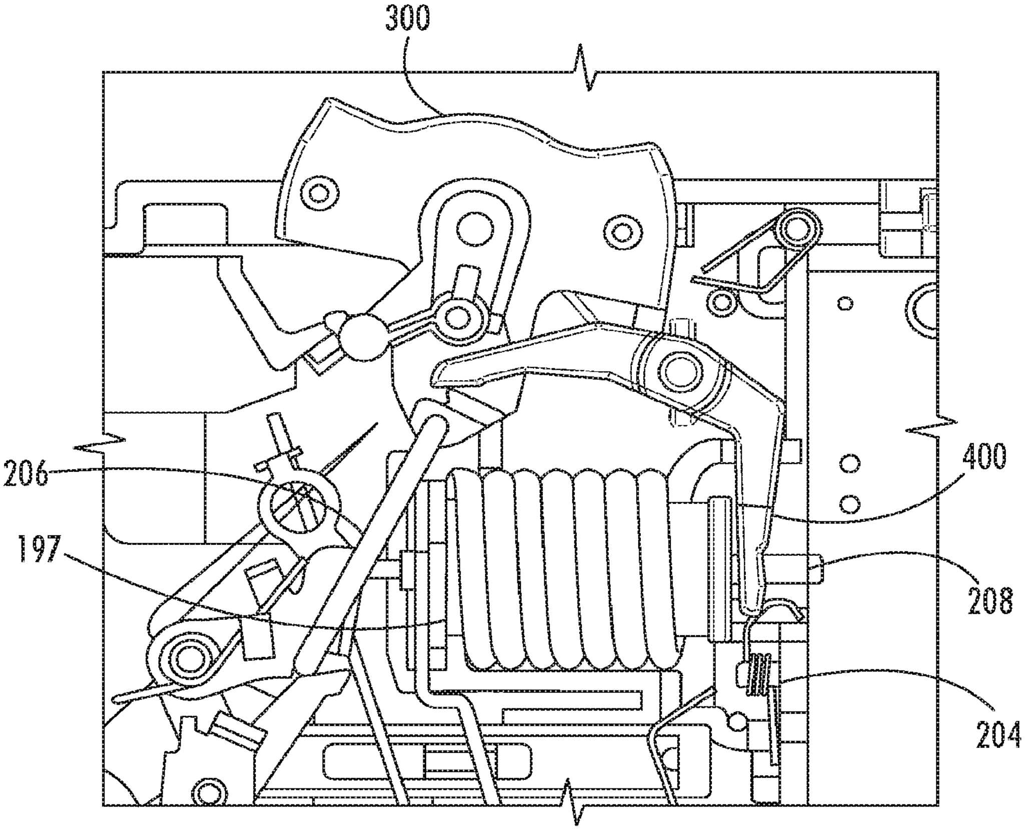
Figure 24:
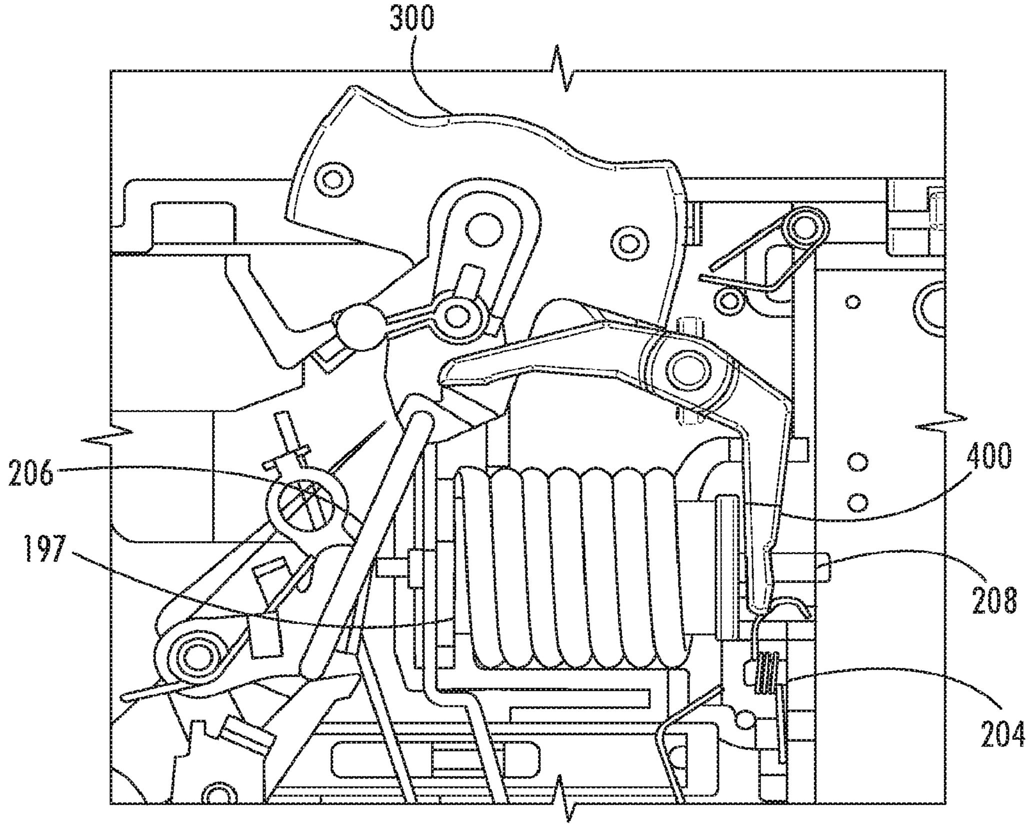

The solenoid 197 is configured to be energized by the controller "C." When energized, the solenoid 197 generates a magnetic field sufficient to move the plunger 208 from a first position (see FIG. 12) to a second position (see FIG. 19). A plunger 208 extends through the solenoid 197 and partially outward relative to both sides of the solenoid 197. The plunger 208 defines an axis "Y1." The plunger 208 includes an elongated shaft having a distal portion 210 and a proximal portion 209. The distal portion 210 of the plunger 208 includes a lip 208*a* configured to interact with a slot 406 defined in the armature 400 (see FIGS. 5-7). The proximal portion 209 of the plunger 208 is configured to function as a stop to catch 150.

Figure 4:
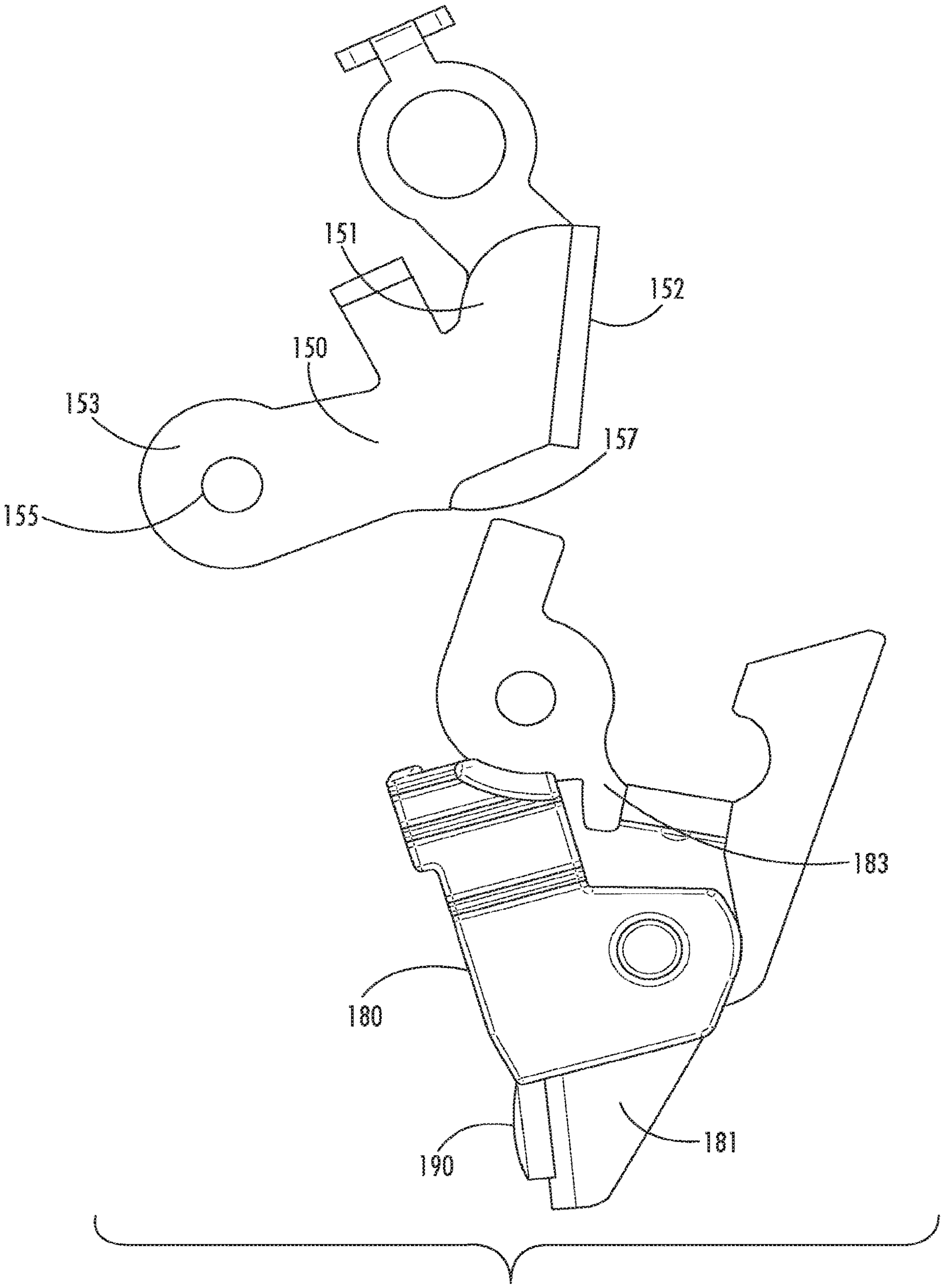
FIG. 4 is a side view of a contact arm and a catch of the circuit breaker of FIG. 1.

With continued reference to FIGS. 2 and 4, contact arm 180 includes a contact support section 181 and a pivot support section 183. Contact arm 180 is biased in a first position by a spring 188. The pivot support section 183 has an outer perimeter, a portion of which has a circular or substantially circular configuration, but may include any suitable geometric configuration. The pivot support section 183 further defines a slot (not shown) therethrough for receiving a pivot pin 185. The contact arm 180 includes a first contact 190 configured to mechanically couple with a second contact 192 attached to a housing portion of housing 101 (e.g., the first contact 190 is moveable and the second contact 192 is fixed, relative to the housing 101). When the first contact 190 and the second contact 192 are mechanically coupled, electrical power may be conducted therebetween. When the rocker 300 is in one of the OFF or MID-TRIP positions (which correspond to the OFF or MID-TRIP states of the circuit breaker 100), the first and second contacts 190, 192 are not mechanically coupled or uncoupled.

The second contact 192 is adjacent to, and in electrical communication with, the line terminal "LINE-T." When the first contact 190 and the second contact 192 are mechanically coupled, electrical power may be conducted therebetween. When the rocker 300 is in the OFF position (which corresponds to the OFF state of the circuit breaker 100), the first and second contacts 190, 192 are not mechanically coupled and are not in electrical communication.

The circuit breaker 100 further includes a catch 150 configured to mechanically engage with the linkage 206 and the contact arm 180. The catch 150 includes a proximal portion 151, a distal portion 153, and a plate 152. The distal portion 153 includes a first linkage portion 155 and a catch portion 157. Catch portion 157 may include a curved portion that protrudes outwardly from a surface of catch 150. Catch 150 is biased in a first position by a spring 158.

To clear the reset lockout mechanism 10 before returning the circuit breaker 100 to the ON state thereof, and/or to verify that the circuit interrupter is operational (e.g., that the circuit is capable of sensing a fault, that solenoid 197 is functioning, and/or that the armature 400 is functioning), electrical power needs to be available to a control circuit or controller "C" of the circuit breaker 100. This is achieved by supplying power to the controller "C" from the line terminal "LINE-T." Power is supplied from the line side, to a DC power supply circuit, and then to the controller "C."

Additional circuit protection components may be included as well, including, without limitation, metal oxide varistors (MOVs) and fuses. By powering the controller "C" with power supplied by the line terminal "LINE-T," the circuit interrupter, including the solenoid 197 and components associated with the solenoid 197, may be tested (since power is available via a controller power supply) prior to resetting the circuit breaker 100 (e.g., prior to disengaging the reset lockout mechanism 10 to allow the circuit breaker 100 to return to the ON state). As a result, the load terminal "LOAD-T," as well as components of the circuit breaker 100 coupled to a load side contact 250, do not receive electrical power during testing of the circuit interrupter.

In various embodiments, the circuitry of circuit breaker 100 may include a GFCI integrated circuit (IC) (not shown) and a controller "C." The GFCI IC is used to detect ground faults and G/N faults and is electrically coupled to a differential transformer (not shown) and a G/N transformer (not shown). The microprocessor or controller "C" can perform additional functionality, such as event logging and self-testing. Event logging may include recording a history of tripping (transitioning to the OFF state), resetting (transitioning to the MID-TRIP state), manual OFF, component failure, and any other suitable event. Self-testing by the controller "C" enables the automatic or selective testing of the components of the circuit breaker 100 without the need for user intervention. In embodiments, the controller "C" may temporarily disable firing the solenoid 197 during the self-test by applying a signal at the output of the controller "C."

Additionally, the controller "C" may energize the solenoid 197 to cause the circuit breaker 100 to transition from the MID-TRIP state to the ON state thereof. To energize the solenoid 197 when transitioning the circuit breaker 100 from the TRIP or MID-TRIP state to the ON state thereof, the controller "C" transmits a signal to the silicon controlled rectifier (SCR) (not shown). Subsequently, the solenoid 197 is energized, thereby displacing the plunger 208 to the left (in relation to the figures). For a further description of the SCR, reference may be made to U.S. application Ser. No. 16/322,039, filed on Jan. 30, 2019, the disclosure of which is hereby incorporated by reference in its entirety.

State, position and/or condition information is electronically communicated to the controller "C." The controller "C" uses this information for event logging (e.g., of tripping and/or resetting of circuit breaker 100). The controller "C" can also monitor other portions of the circuitry to detect whether various portions of the circuitry (e.g., mechanical and/or electric component failures) have failed, are failing, or will fail within some predetermined predictive failure parameter (e.g., time, use, etc.). In addition, the controller "C" is electrically coupled to an indicator (e.g., an LED light assembly; see FIG. 36) to alert users to any number of conditions such as a malfunctioning, deterioration, failure and/or an end of life of the circuit breaker 100 and/or components thereof, the presence and/or type of a fault detected by the controller "C," and/or any other condition that can jeopardize the integrity and/or safety standards associated with the conductive path or condition of the circuit breaker 100 or its components.

Figure 5:
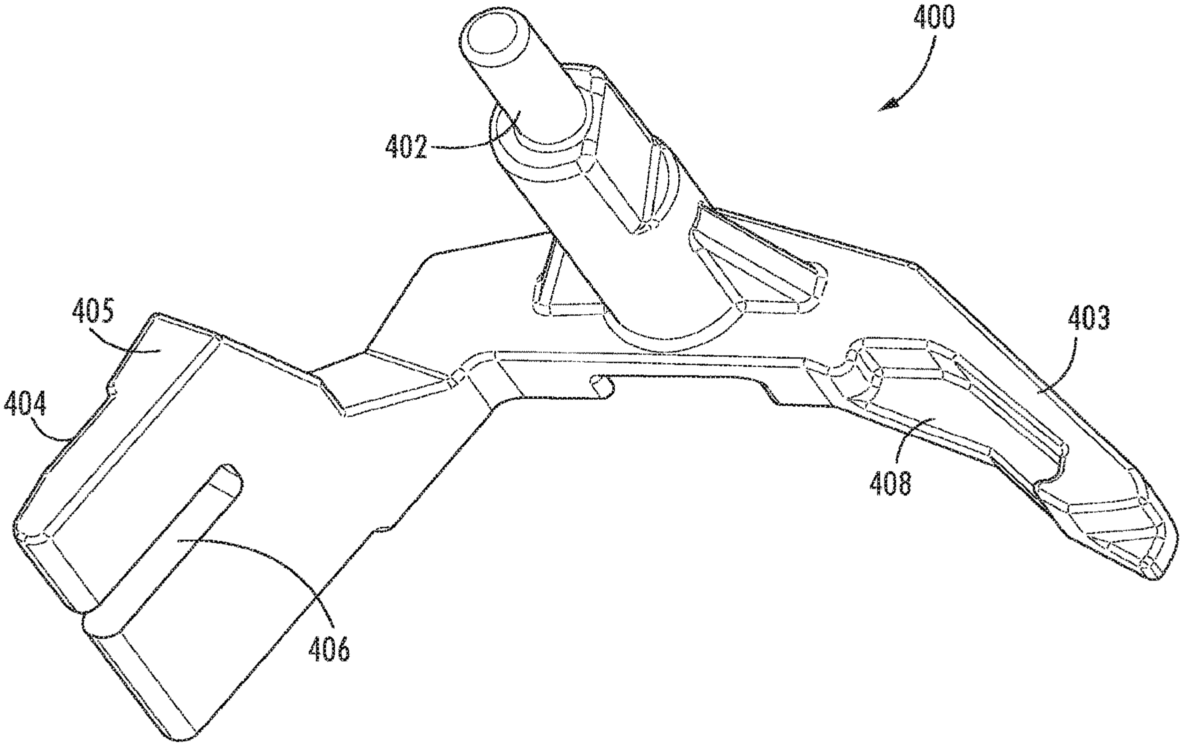
FIGS. 5-7 are various perspective views of an armature of the reset lockout mechanism.
Figure 6:
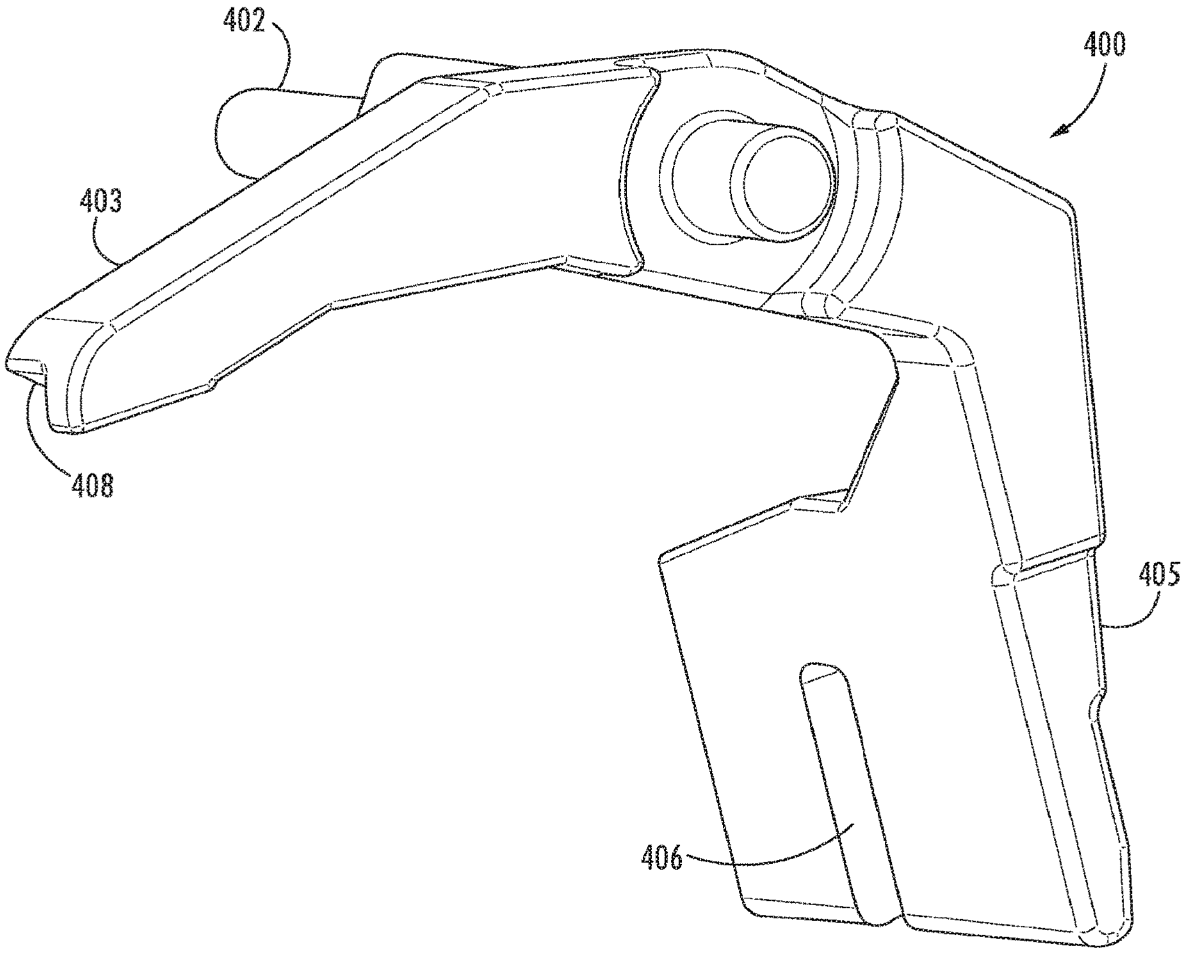
Figure 7:
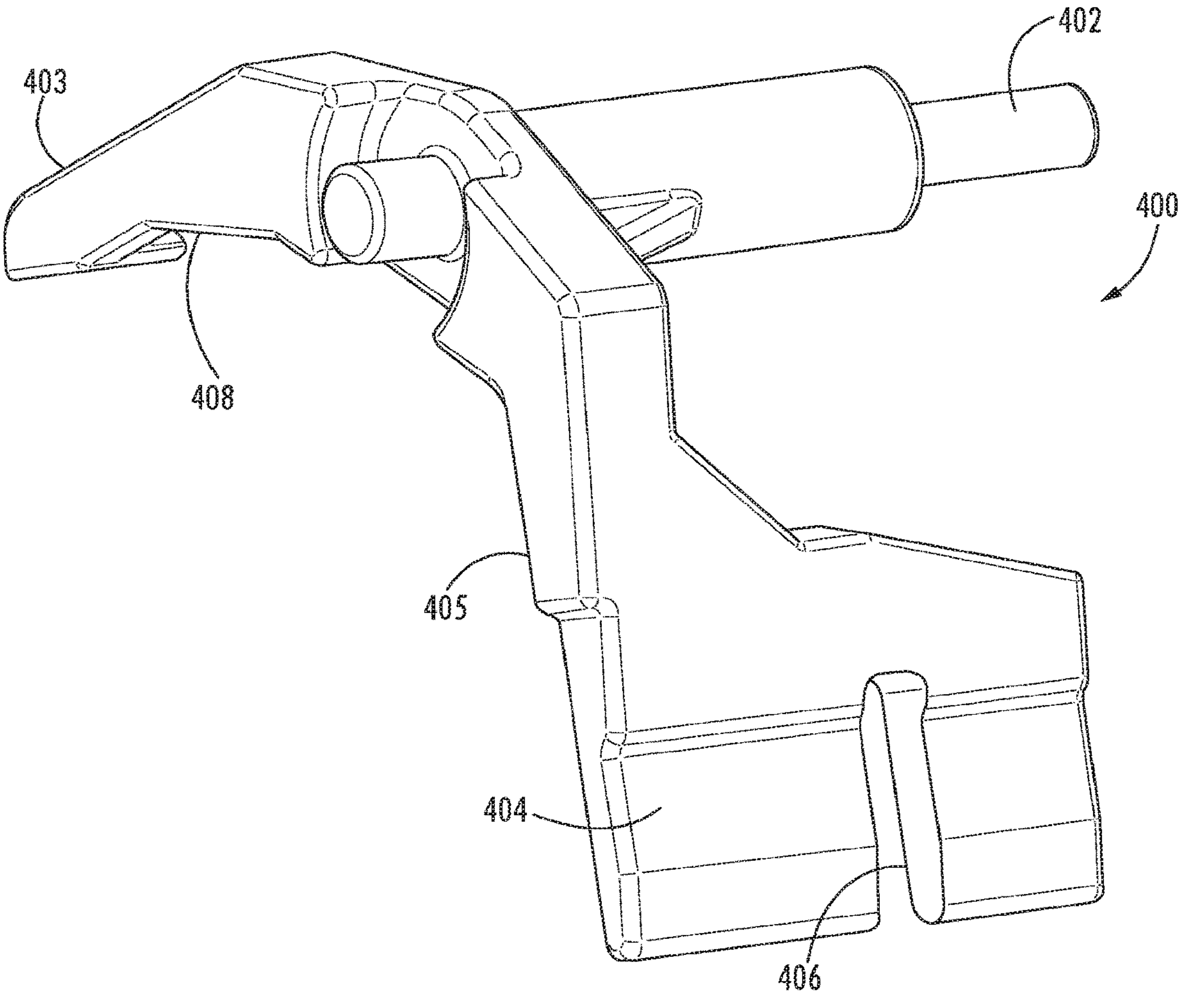
Figure 8:
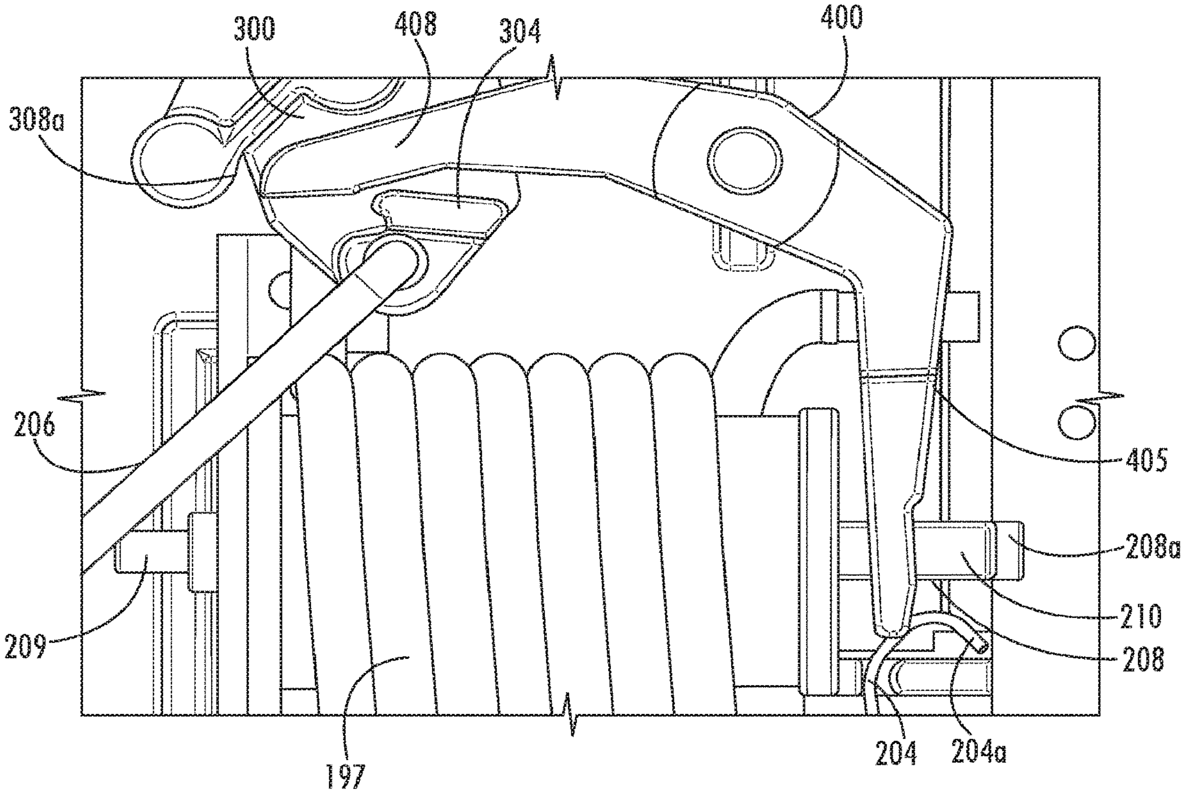
FIG. 8 is an enlarged side view of some of the internal components of the circuit breaker of FIG. 1.

FIGS. 5-7 show various views of the armature 400. The armature 400 is selectively engageable with the rocker 300 to trigger the opening of the conductive path, between the line phase terminal "LINE-P" and load phase terminal "LOAD-P," when a fault condition occurs. The armature 400 includes a pivot member 402, a first arm 403, and a second arm 405. The pivot member 402 is configured to enable the armature 400 to pivot between a first position (FIG. 12) and a second position (FIG. 13) about the pivot member 402. The outer surface of the first arm 403 defines a pocket 408. The pocket 408 is configured to mechanically engage the armature engagement face 308*a* of the rocker 300 during a portion of the motion from the OFF position towards the ON position of the rocker 300 to prevent the rocker 300 from rotating in direction "A." The second arm 405 is configured to mechanically engage with the plunger 208. The outer surface of the second arm 405 includes an engagement face 404 and defines a slot 406 therein. The slot 406 is configured for receipt of the plunger 208. The engagement face 404 is configured to be displaced by the plunger 208 such that the armature 400 pivots into the second position if the circuit breaker 100 is operational (see FIG. 10).

Figure 9:
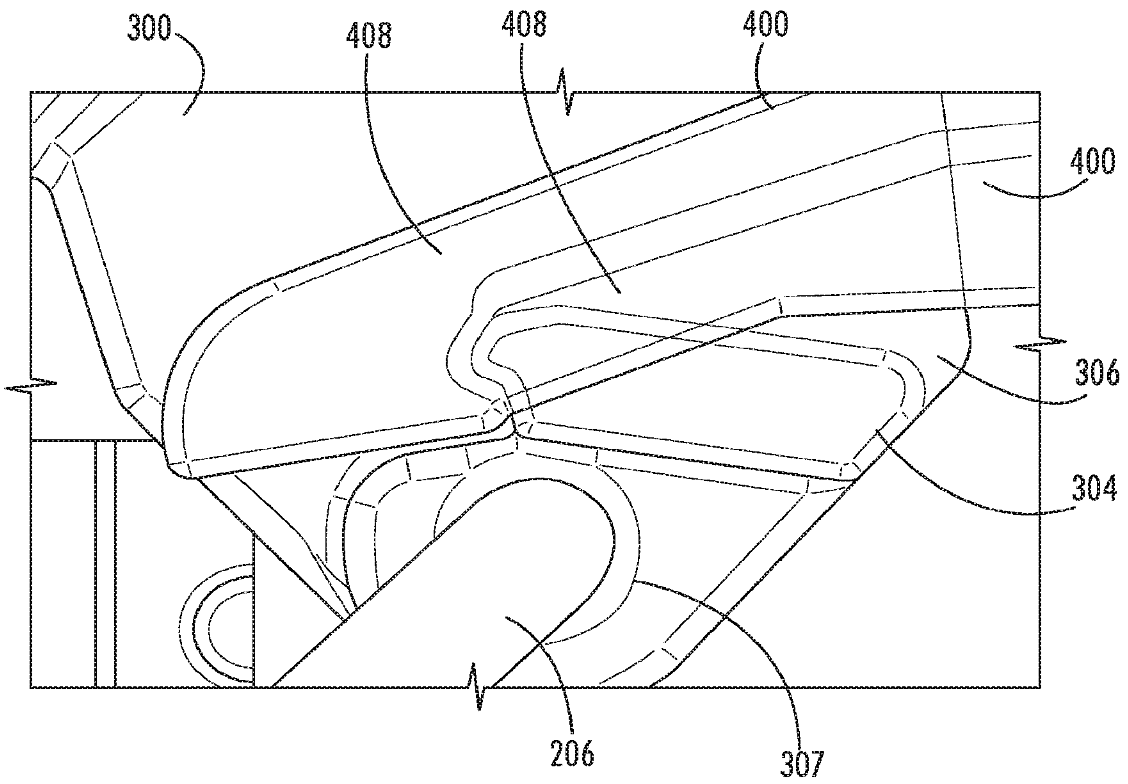
FIGS. 9 and 10 are enlarged side views of portions of the reset lockout mechanism as the reset lockout mechanism moves between positions corresponding to the OFF state and the ON state of the circuit breaker.

FIGS. 8-14 illustrate operation of the reset lockout mechanism 10 in accordance with this disclosure. With reference to FIG. 9, when the rocker 300 is pressed by a user from the OFF position towards the ON position thereof, switch spring 211 (FIG. 2) and conductive member 212 (FIG. 2) make electrical contact, which is sensed by the controller "C," causing controller "C" to run a fault test (e.g., a simulated fault) and determine if a fault is detected. If the circuit breaker 100 is non-operational, the solenoid 197 remains de-energized and the armature 400 stays in the first position (see FIG. 9). When the armature 400 is in the first position, the armature pocket 408 and the engagement face 304*a* interact to provide a mechanical stop and prevent the motion of the rocker 300 from transitioning the circuit breaker 100 to the ON state thereof.

Figure 10:
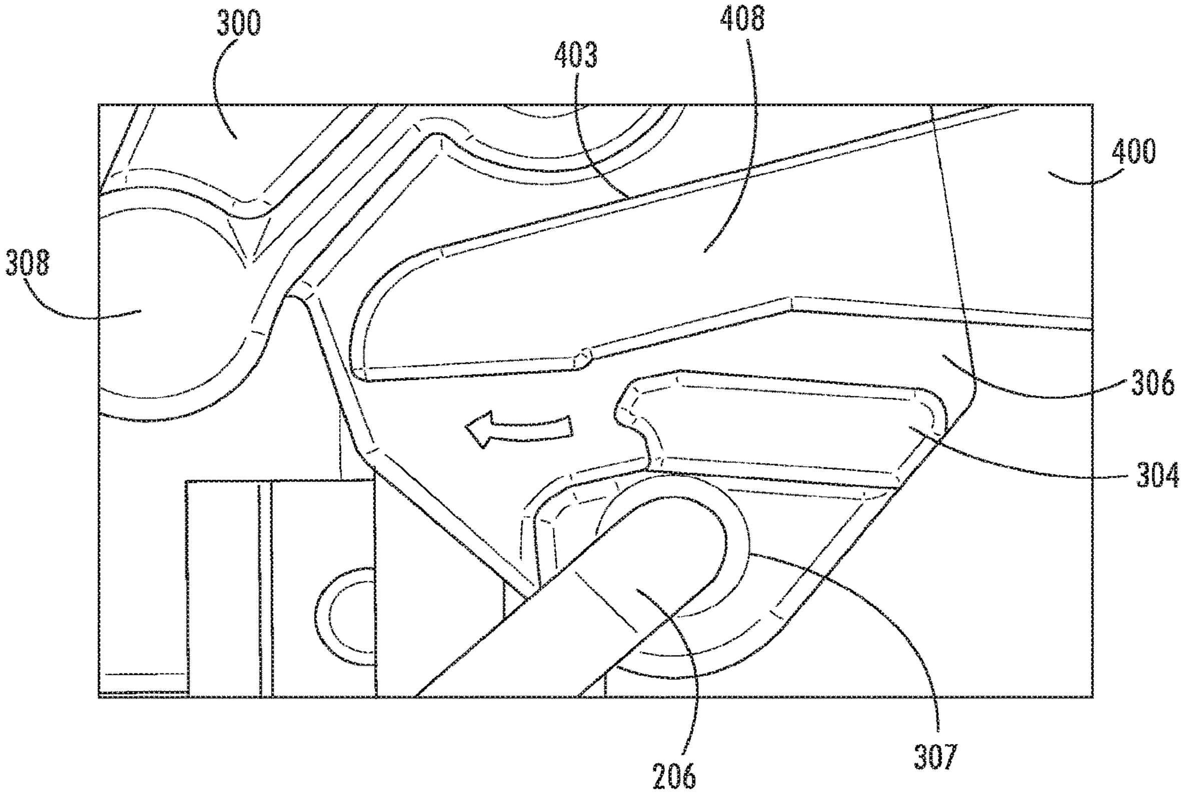
Figure 11:
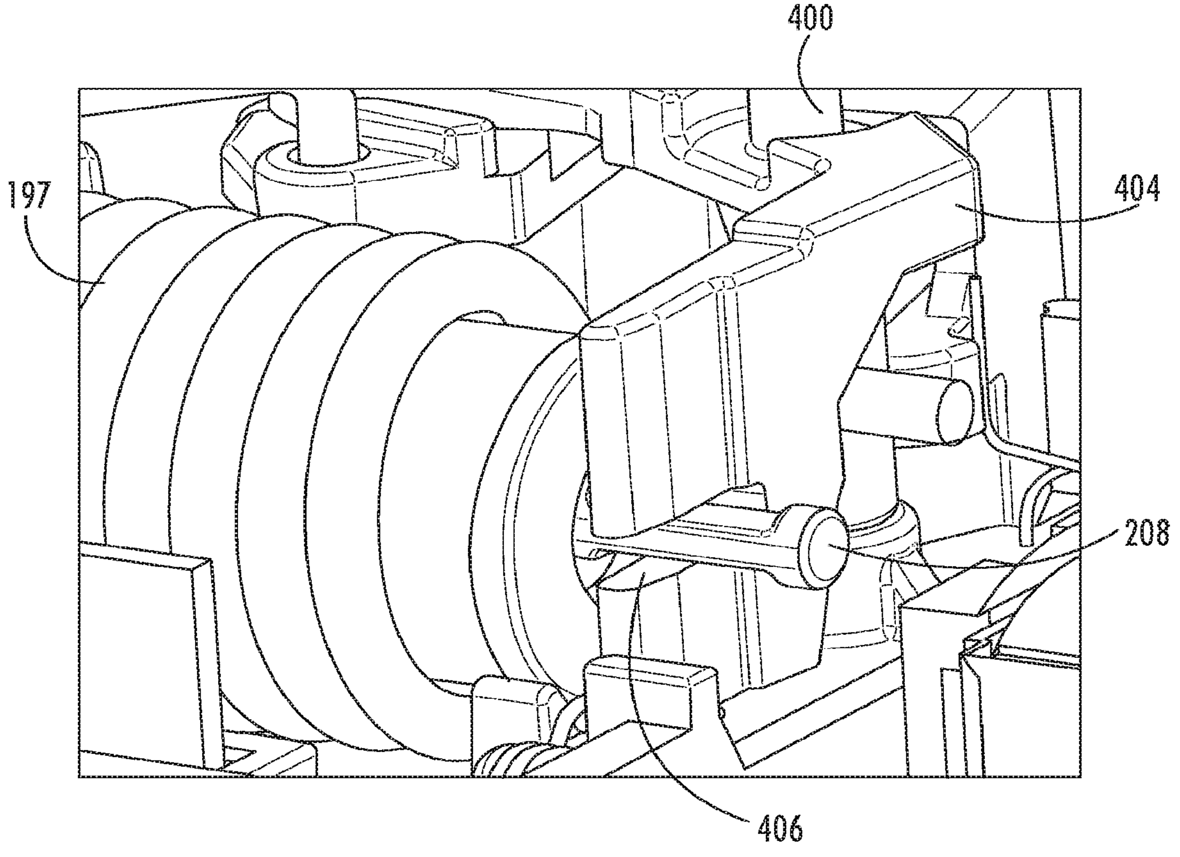
FIG. 11 is a perspective view of the armature and a solenoid of the circuit breaker of FIG. 1.

With reference to FIGS. 10 and 11, in a case where the controller "C" does not detect that a fault is present (e.g., the circuit breaker is non-operational), the solenoid 197 is configured to move the plunger 208 between a first position and a second position. The plunger 208 includes a lip 208*a*. The lip 208*a* interacts with the engagement face 404 of the armature 400 and pivots the armature 400 into the second position, and the rocker 300 path is free from obstruction (e.g., the armature pocket 408 and the engagement face 304*a* are disengaged). The circuit breaker 100 may then be fully transitioned to the ON state.

Figure 12:
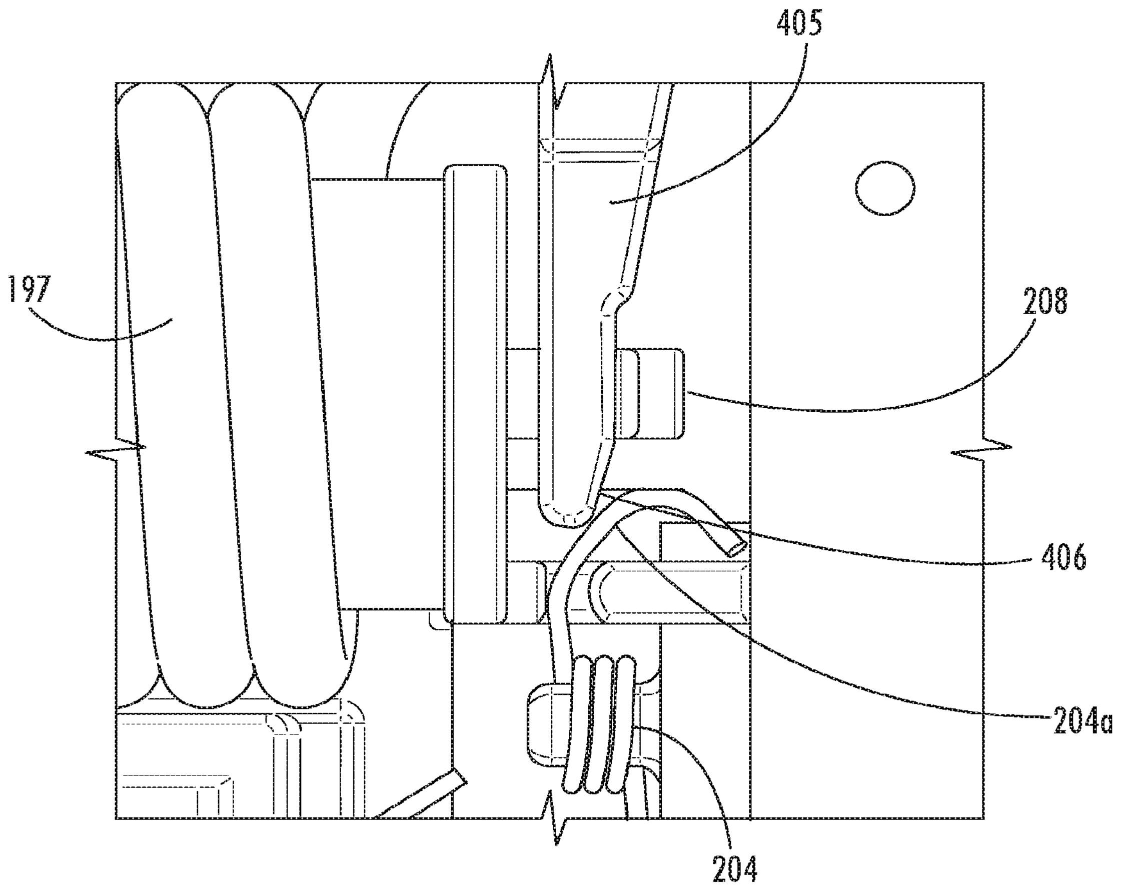
FIGS. 12 and 13 are progressive side views illustrating movement of portions of the reset lockout mechanism.
Figure 13:
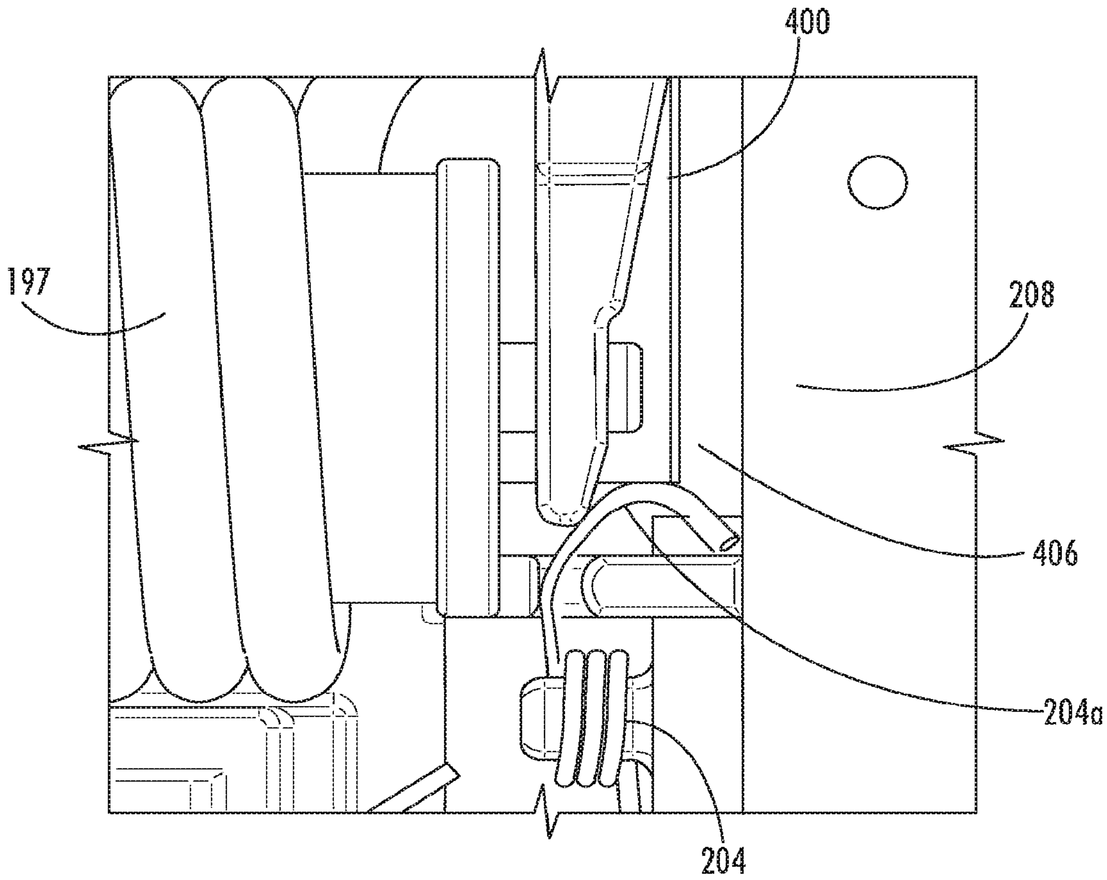

With reference to FIGS. 12 and 13, the detent spring 204, which may be a torsion spring, is configured to act as a detent and keep the armature 400 in position by providing resistance to the second arm 405 of the armature 400 while the plunger 208 is in the second position. The detent spring 204 is further configured to keep the armature 400 in position by providing resistance to the second arm 405 of the armature 400 while the plunger 208 is in the first position. The detent spring 204 includes a leg 204*a*. The leg 204*a* may be curved to provide resistance to pivoting of the second arm 405 of the armature 400. For example, as shown in FIG. 12, the armature 400 is in the first position such that the rocker 300 motion is blocked by the armature 400, and the circuit breaker 100 cannot be reset to the ON state thereof. As seen in FIG. 13, in the second position of the armature 400, the rocker 300 motion is free, and the circuit breaker 100 can be reset to the ON state thereof.

Figure 14:
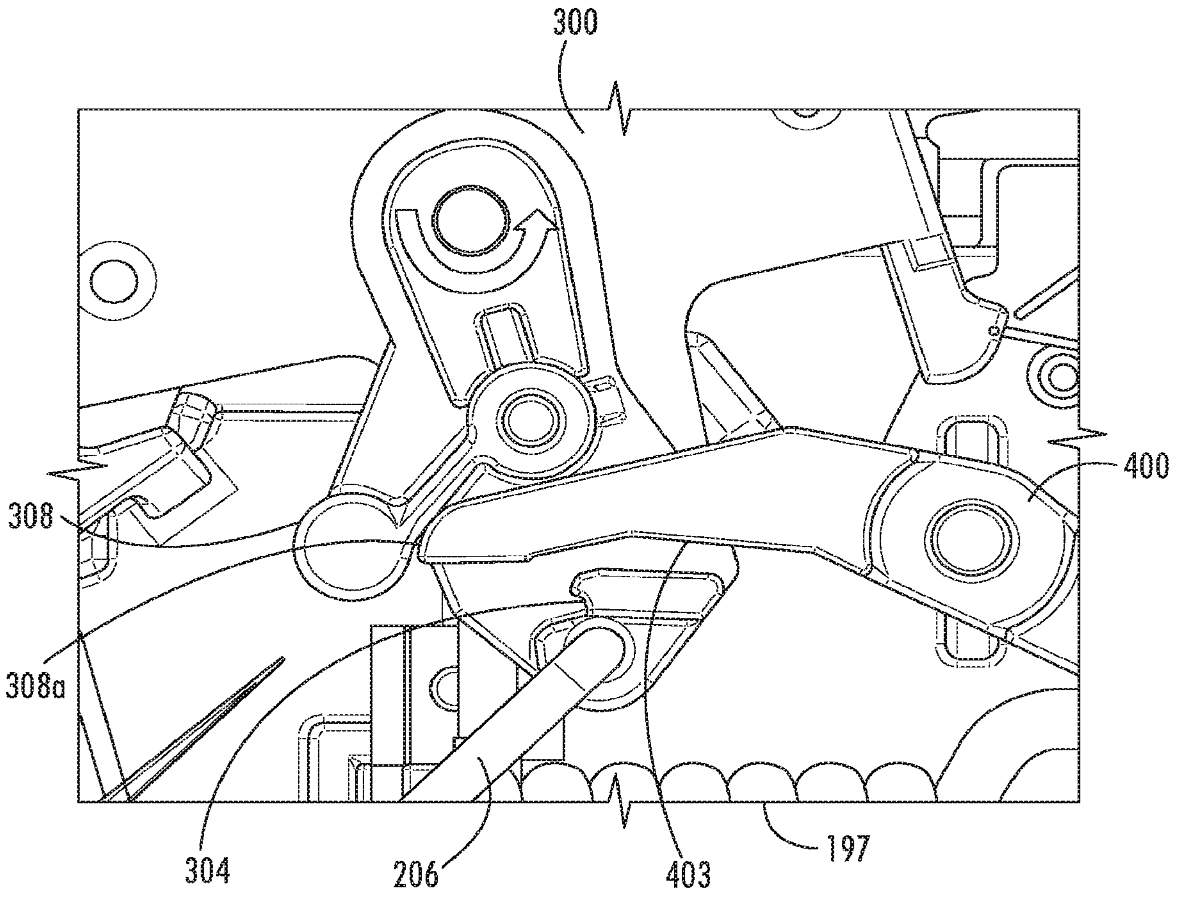
FIG. 14 is a side view illustrating portions of the reset lockout mechanism when in a position corresponding to the OFF state of the circuit breaker.

With reference to FIG. 14, during counterclockwise rotation of the rocker 300 to the OFF position thereof, the armature engagement face 308*a* strikes the first arm 403 of the armature 400, and the armature 400 is forced back into the first position.

FIGS. 15-34 are progressive views of the reset lockout mechanism 10 in accordance with this disclosure. The reset lockout mechanism 10 is configured to transition generally between an engaged position and a disengaged position. Further, in the engaged position, the circuit breaker 100 may exist in the OFF state or the MID-TRIP state thereof. The first and second contacts 190, 192 of the contact arm 180 remain in the OPEN position (e.g., not touching each other) when reset lockout mechanism 10 is in the engaged position thereof. Likewise, when the reset lockout mechanism 10 is in the engaged position (the circuit breaker 100 is either in the OFF or MID-TRIP state), the circuit breaker 100 cannot be reset, e.g., the conductive path cannot be closed, unless the circuit interrupter is operational.

Figure 15:
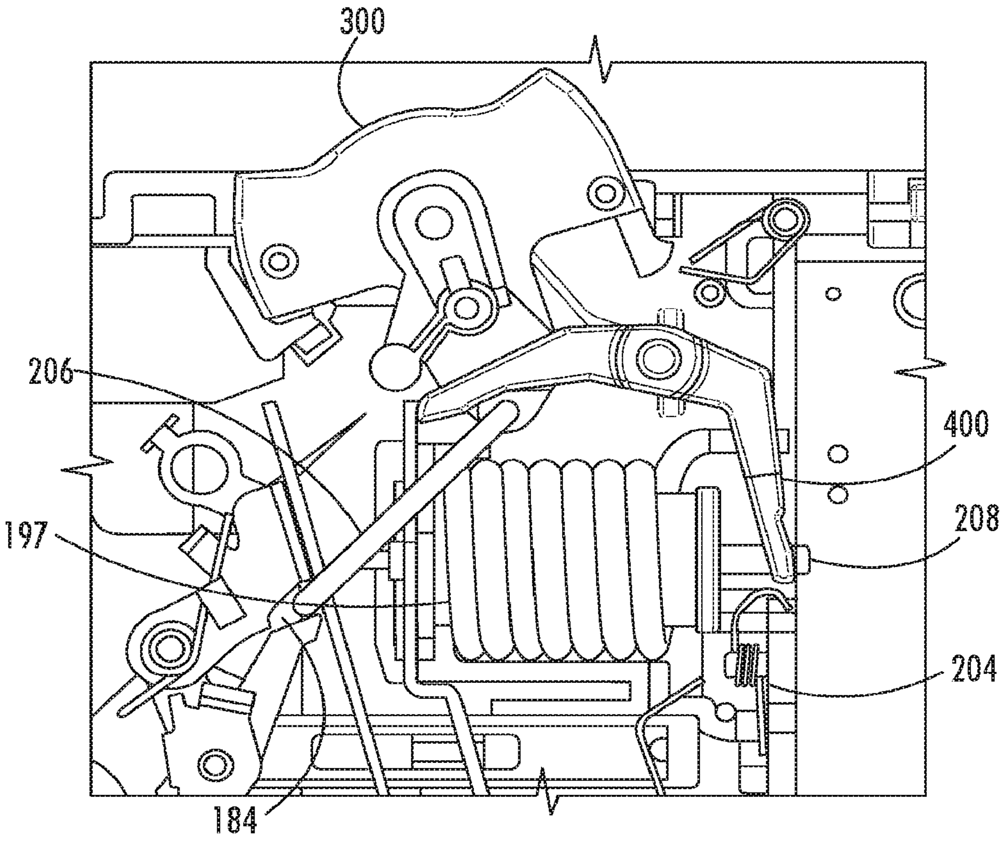
FIGS. 15-25 are progressive views illustrating movement of the reset lockout mechanism between positions corresponding to the OFF state and the ON state of the circuit breaker.

Initially, in FIG. 15, the rocker 300 is in the OFF position, and the plunger 208 is in a first position. The switch engagement face 309*a* of the rocker 300 pushes a distal end 211*a* of switch spring 211 and prevents switch spring 211 from making electrical contact with conductive member 212. The circuit breaker 100 is shown prior to the application of a force to the second side 305 of the rocker 300 in the direction "A." The force exerted on the second side 305 of the rocker 300 is applied by a user to transition the circuit breaker 100 from the OFF or MID-TRIP state to the ON state. The applied force causes linkage 206 to move such that linkage 206 transfers the applied force downward (and to the left in the figure) to the catch 150 and the contact arm 180. As the downward force is applied to the linkage 206, the linkage 206 rotates the catch 150 and the contact arm 180 clockwise.

Figure 16:
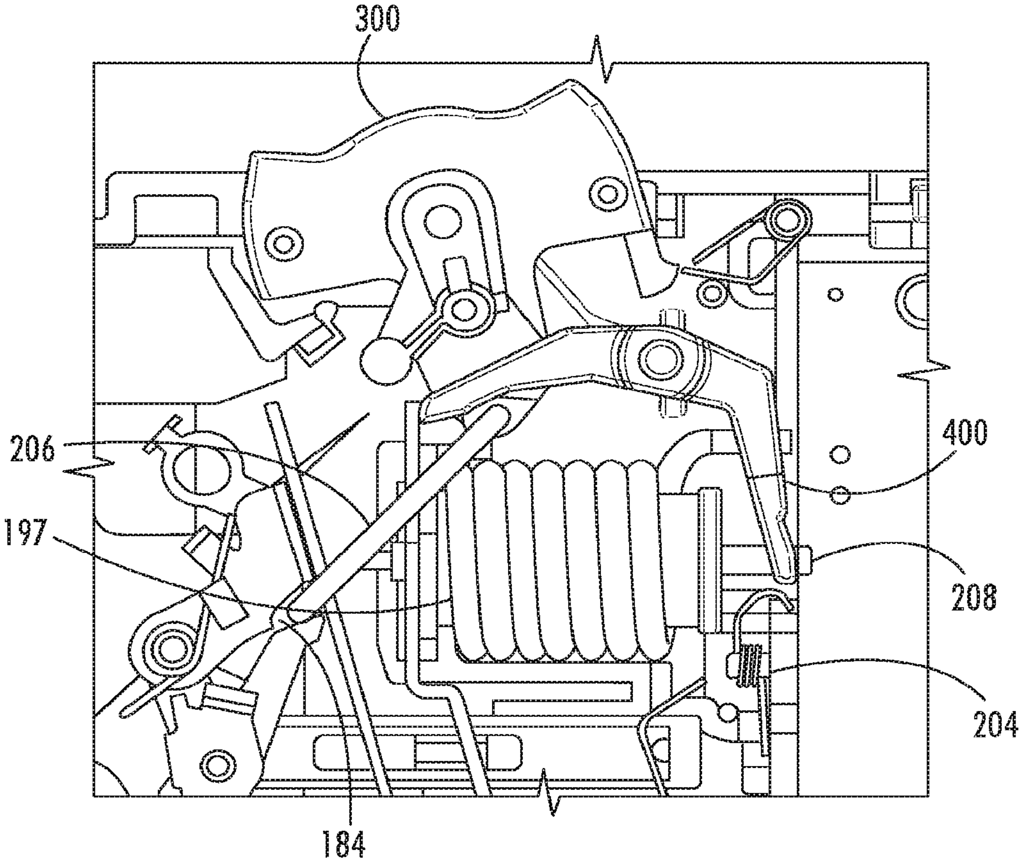
Figure 17:
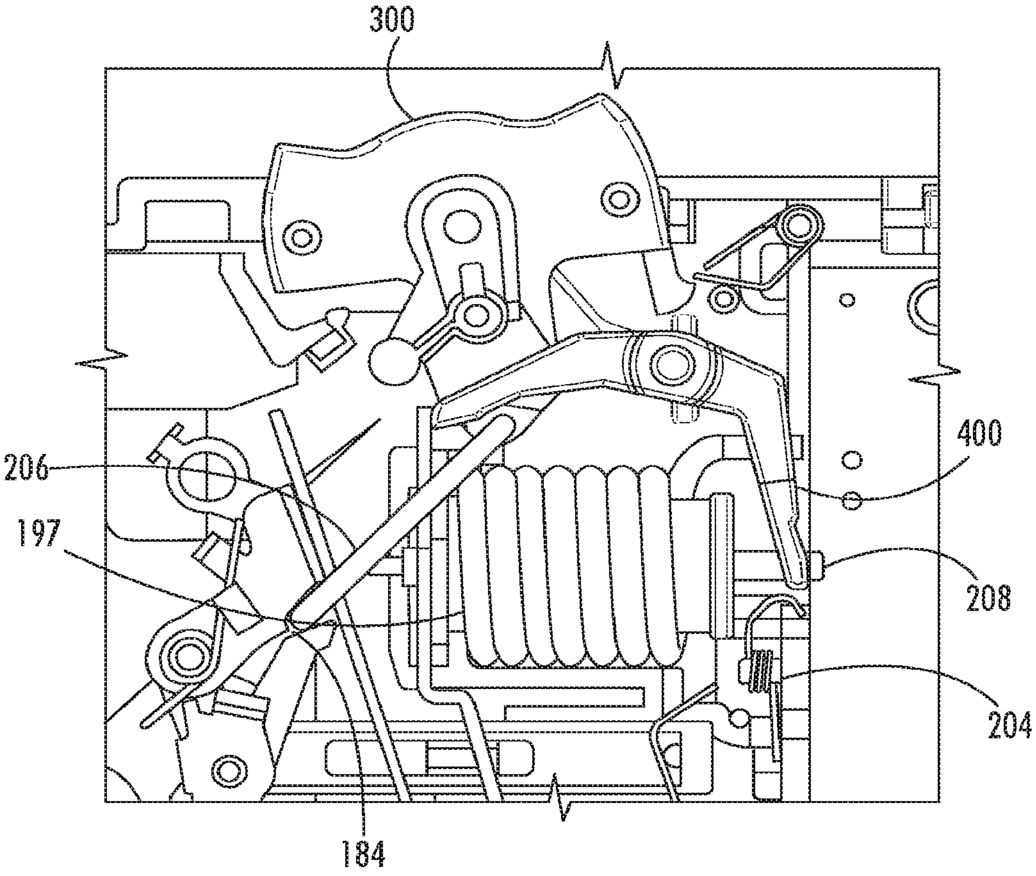

With reference to FIGS. 16-17, the force continues to be applied by the user to the second side 105 of the rocker 300 in the direction "A" in order to transition the circuit breaker 100 to the ON state thereof. The force applied to the second side 105 of the rocker 300 causes the linkage 206 to continue to rotate the catch 150 and the contact arm 180.

As the rocker 300 is rotated towards the ON position thereof (see FIGS. 16-18), the switch engagement face 309*a* of the rocker 300 releases the distal end 211*a* of switch spring 211 and enables the switch spring 211 to make electrical contact with conductive member 212. The controller "C" performs a self-test and determines that there is no fault condition (e.g., the circuit 100 breaker is non-operational), so the solenoid 197 is energized and moves the plunger 208 to a second position (see FIGS. 18 and 19).

The first end 206*b* of the linkage 206 is coupled to and mechanically engaged by the bottom extension 307 of the rocker 300. The catch 150 is pivotably coupled to the housing 101 and mechanically cooperates with contact arm 180. The contact arm 180 is pivotably connected to the housing 101 at the same point as the catch 150. The contact arm 180 and the catch 150 are configured to mechanically cooperate to enable the first and second contacts 190, 192 of the contact arm 180 to make electrical contact during the ON condition of the circuit breaker 100. The contact arm 180 and the catch 150 define a slot 184 in a first position of the contact arm 180 and a first position of the catch 150. The second end 206*a* of the linkage 206 slidably engages the slot 184 and rotates the contact arm 180 and the catch 150 clockwise.

Figure 18:
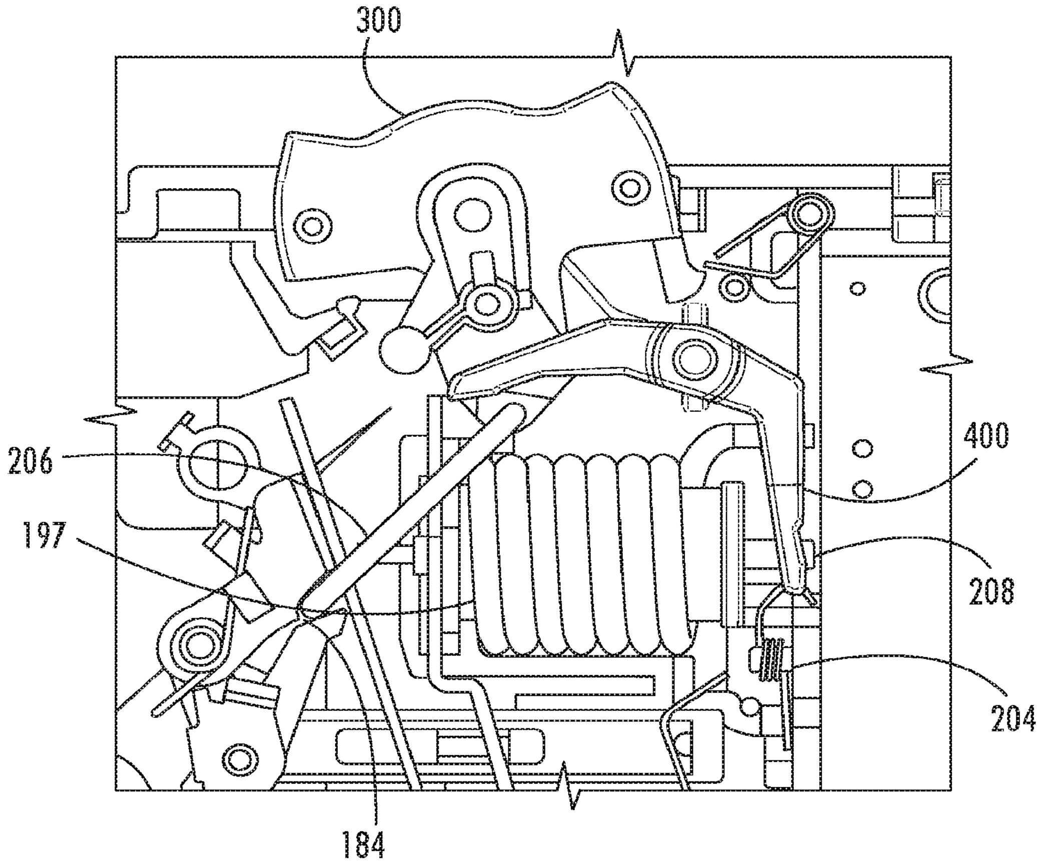

With continued reference to FIGS. 18 and 19, the lip 208*a* of plunger 208 interacts with the slot 406 in the armature 400 and pivots the armature 400 into the second position, lock nub 304 and armature pocket 408 are disengaged, and the rocker 300 path is free from obstruction. The circuit breaker 100 may then be transitioned to the ON state thereof. The detent spring 204 is configured to act as a detent and keeps the armature 400 in position by providing resistance to the armature 400 of the engagement face 404 while the armature 400 is in the second position.

With reference to FIGS. 20-25, while the rocker 300 continues to rotate to the ON position thereof, the rocker 300 continues to rotate the contact arm 180 and the catch 150 clockwise, enabling a conductive path to be formed between the line phase terminal "LINE-P" and load phase terminal "LOAD-P." Before the rocker 300 can go to the ON position thereof, rocker 300 must go from the MID-TRIP position thereof to the OFF position thereof to clear the reset lockout mechanism 10. If the user tries to rotate the rocker 300 to the ON position thereof, prior to resetting the reset lockout mechanism 10, the reset lockout mechanism 10 prevents the rocker 300 from transitioning the circuit breaker 100 to the ON state thereof.

With reference to FIGS. 26-34, the controller "C" detects that a fault is present and de-energizes the solenoid 197. For example, a G/N fault occurs when there is a connection between load neutral and the ground conductor. The presence of a G/N fault occurs when neutral, and ground conductors are connected both on the line side and the load side of a differential transformer (not shown) and the G/N transformer (not shown). This results in a conductive loop which then magnetically couples the differential transformer (not shown) and the G/N transformer (not shown) together. When this happens, the differential transformer (not shown) and G/N transformer (not shown) create positive feedback, which causes an amplifier of the GFCI integrated circuit (IC) (not shown) coupled to the sensing circuitry to oscillate. When the amplifier—oscillates, the sensing circuitry interprets this as a high frequency ground fault and engages the circuit interrupting portion. The solenoid 197 moves the plunger 208 axially/linearly from the first position to the second position. The plunger 208 knocks into plate 152, causing catch 150 to rotate counterclockwise, which results in the disengagement of the linkage 206 by the catch 150 and the contact arm 180. As the catch 150 and the contact arm 180 continue to rotate counterclockwise, the first and second contacts 190, 192 of the contact arm 180 are mechanically uncoupled.

As the rocker 300 continues to be rotated towards the OFF position thereof, the armature engagement face 308*a* of the rocker 300 mechanically engages the armature 400. The armature 400 is rotated into the first position thereof. The proximal portion 209 of the plunger 208 pushes against the plate 152 of the catch 150 and functions as a stop.

Figure 35:
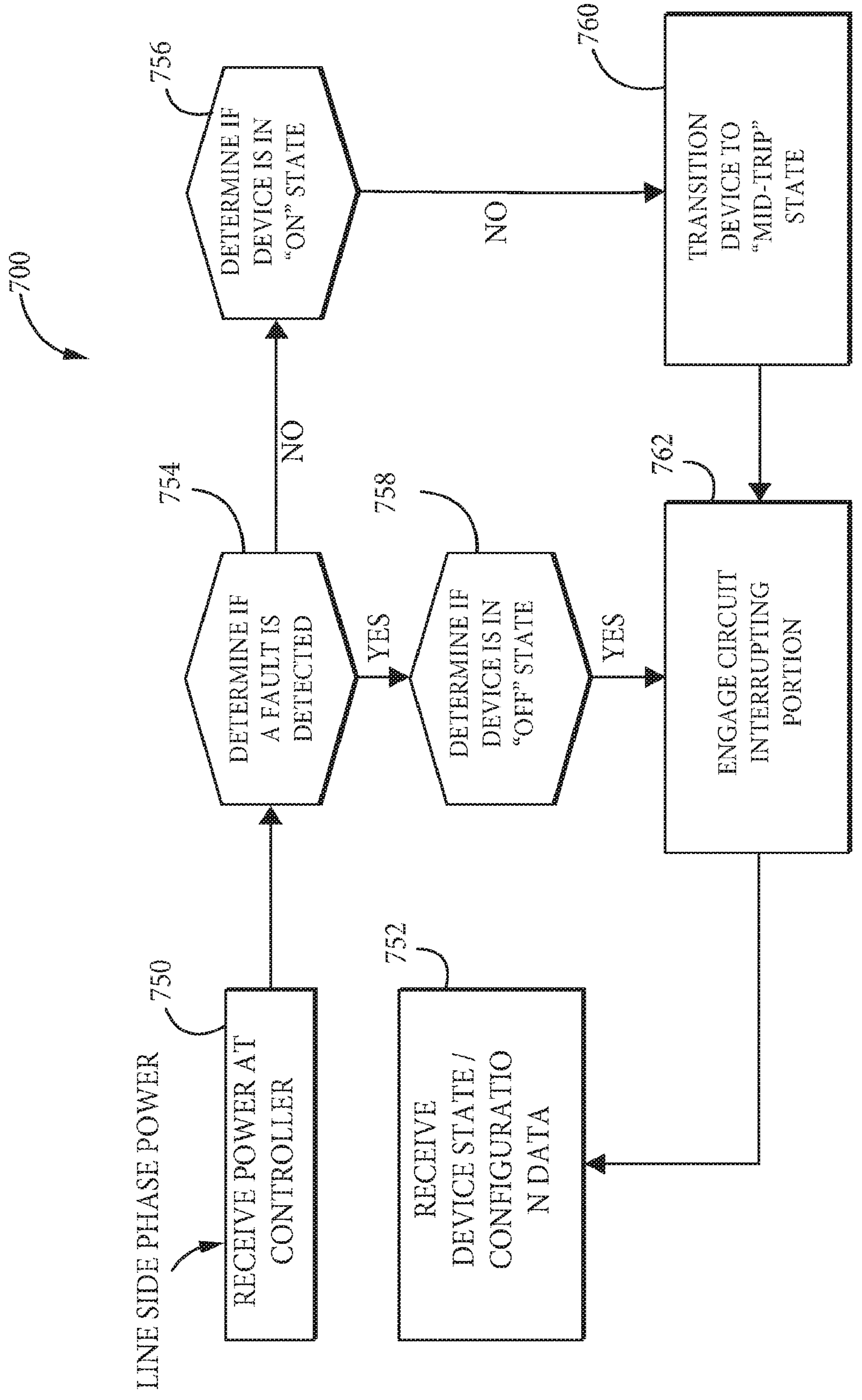
FIG. 35 is a flow diagram illustrating a process in accordance with the principles of this disclosure.

Referring now to FIG. 35, a flow diagram is provided illustrating the operation of the circuit breaker 100. More particularly, FIG. 35 illustrates a process 700 executed by the controller "C." Initially, the controller "C" receives electrical power from the line terminal "LINE-T" (Step 750) via a rectifier and a voltage regulator circuit. The controller "C" receives information associated with the components of the circuit breaker 100, which are monitored by the controller "C" (Step 752). The information received by the controller "C" may include voltage measurements taken at line terminal "LINE-T" and the load terminal "LOAD-T," and current measurements obtained at the transformers "T" which are used to determine whether there is a current imbalance, a low current, a high current, etc. More particularly, current measurements obtained at the transformers "T" enable the controller "C" to determine if one or more predetermined conditions or faults exist such as, without limitation, ground faults, arc faults, shared-neutral conditions, overcurrent conditions, etc. The controller "C" may update an event log with the information received and the existence or occurrence of any predetermined conditions or faults. Additionally, the controller "C" may determine, based on the voltage measured at the line terminal "LINE-T" and the load terminal "LOAD-T," whether the circuit breaker 100 is in the MID-TRIP state or the ON state thereof.

If the measurements of current between the line terminals "LINE-T" and the load terminals "LOAD-T" indicate a current imbalance or vary beyond a predetermined threshold, the controller "C" may determine that a ground fault or G/N fault condition is present. Additionally, the controller "C" may receive sensor signals indicative of an arc fault. For example, a high-frequency transformer and/or other components/circuitry of transformer assembly may provide sensor signals indicative of an arc fault.

Upon determining that any of the faults described throughout this disclosure are present (Step 754), the controller "C" further determines the state (e.g., ON or OFF) of the circuit breaker 100 (Step 758). In a case where the controller "C" determines that a fault is present and circuit breaker 100 is in the OFF state (Step 758), the circuit interrupting portion is or becomes engaged (Step 762). Alternatively, if no fault is detected, and the controller "C" determines that the circuit breaker 100 is in the ON state (Step 756), the controller "C" may further determine whether a predetermined condition exists requiring the circuit breaker 100 to transition to the OFF state. Once a fault (or predetermined condition) is detected, the circuit breaker 100 may display an indication to users indicative of the presence or type of fault (see FIG. 36) or condition while the circuit breaker is in the OFF state.

If a fault (or predetermined condition) is detected (Step 754) and the circuit breaker 100 is determined not to be in the OFF state, the controller "C" sends a control signal to energize the circuit interrupter, which may be a solenoid 197 (Step 762). Once the solenoid 197 receives the control signal from the controller "C," the solenoid 197 generates a magnetic field, thereby drawing the plunger 208 from the first position to the second position. Drawing the plunger 208 to the second position transitions the circuit breaker 100 from the ON state thereof to the OFF state thereof. As a result, when a user attempts to transition the circuit breaker 100 to the ON state, the controller "C" must, once a fault is no longer detected (Step 754), reenergize the solenoid 197 to transition the circuit breaker 100 to the ON state.

Figure 34:
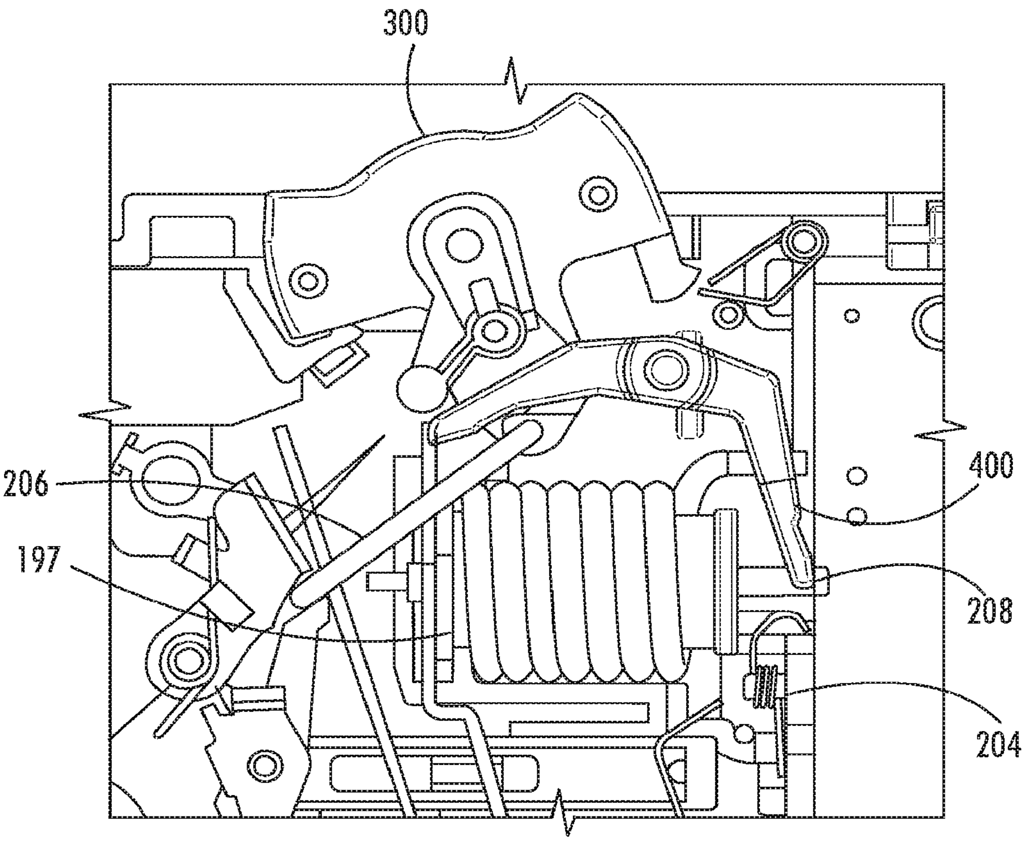

If no fault (or predetermined condition) is detected (Step 754), the controller "C" determines the state of the circuit breaker 100 (e.g., OFF or ON state) (Step 756). If the controller "C" determines the circuit breaker is in the OFF state, the controller "C" sends a control signal to the solenoid to draw the plunger 208 into the first position to transition the circuit breaker 100 to the MID-TRIP state (760). Once the circuit breaker 100 is in the MID-TRIP state, force applied to the first side 303 transitions the circuit breaker 100 to the OFF state. When force is applied to the second side 105 of the rocker 300 in the direction "A" (FIG. 2) while the circuit breaker is in the OFF state, the reset lockout mechanism 10 is cleared as the circuit breaker 100 transitions to the ON state. As illustrated in FIG. 34, as the controller "C" determines whether a fault is present (Step 754), and causes the circuit breaker 100 to transition to the OFF state, to the MID-TRIP state, or to maintain the ON state, process 700 is reiterated to provide analysis of the state of the circuit breaker 100. Notably, when the circuit breaker 100 transitions to a MID-TRIP state, circuit breaker 100 cannot transition back to the ON state until first transitioning to the OFF state.

Figure 36:
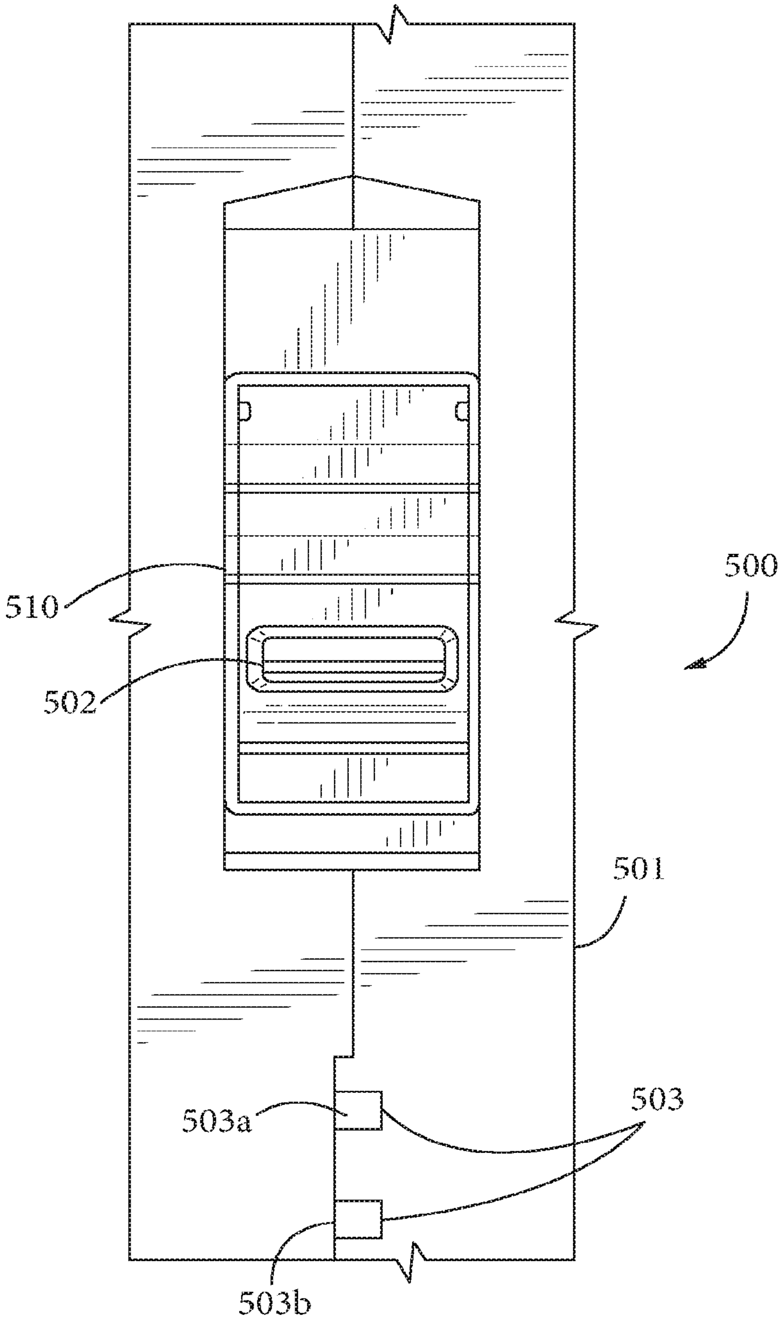
FIG. 36 is a plan view of an embodiment of a circuit breaker user interface incorporating indicator lights in accordance with the principles of this disclosure.

With reference to FIG. 36, a front plan view of a circuit breaker 500 is shown, which includes one or more indicators 503 such as a first indicator 503*a* and a second indicator 503*b*. The first and second indicators 503*a*, 503*b*, as well as a rocker window 502, are configured to output color signals indicative of various states of operation in which the circuit breaker 500 may be. Depending on whether the reset lockout mechanism 10 (FIG. 1) of circuit breaker 500 is in the ON or OFF position thereof, the rocker window 502 displays binary signals corresponding to the position of the reset lockout mechanism 10. Additionally, the first and second indicators 503*a*, 503*b* may display various color signals indicative of associated faults detected by the controller.

More specifically, FIG. 36 shows circuit breaker in the form of a GFCI circuit breaker with two LED indicators 503. The various operational states thereof are visually indicated via a combination of electronic (e.g., LED) and/or mechanical elements. For states that are indicated by a mechanical element, this may be indicated by the position of the rocker thereof and/or a color flag being made visible through a window 502 defined in a central portion of the rocker. More specifically, in the case of the mechanical indication, there may be a plurality of color markings, one of which is visible to the user depending on the position of the rocker 510. For example, when in the OFF position, the rocker 510 would be arranged to expose the same color as the overall housing through window 502 (e.g., white or black). Alternatively, a different color may be used to indicate the OFF position of the rocker. When in the ON position thereof, the rocker 510 would be arranged so that a green color could be exposed through the window 502. When in the MID-TRIP position, the rocker 510 would be arranged so that a red color is exposed through the window 502.

In addition to the mechanical indication provided by the rocker 510, the one or more indicators 503 may be included. For example, a GFCI circuit breaker may have a first indicator 503*a*, which may be in the form a first LED, disposed in a first location, an AFCI circuit breaker may have a second indicator 503*b*, which may be in the form a second LED in a second location, and a combination AFCI/GFCI circuit breaker may include the first and second indicators 503*a*, 503*b* (e.g., LED) in both the first and second locations, respectively. By locating the indicators 503 in the first location, the second location, or both the first and second locations based on the type of protection provided by the circuit breaker (GFCI, AFCI, and AFCI/GFCI respectively), a more intuitive user interface 500 is provided. This user interface 500 may help users distinguish between different circuits when viewing multiple circuit breakers disposed along a circuit breaker panel (not shown) since the indicators will be aligned.

In the case of a GFCI circuit breaker, the various states may be indicated as in the following table.

| State | Rocker Actuator | GFCI LED |
|---|---|---|
| ON | GREEN | OFF |
| MID-TRIP due to Overcurrent | RED | OFF |
| MID-TRIP due to Ground Fault | RED | STEADY ON |
| MID-TRIP due to Self-Test Failure (locked out) | RED | BLINKING (0.1 s on/0.1 s OFF) |
| OFF | WHITE (or BLACK) | OFF |

In the case of an AFCI circuit breaker, the various states may be indicated as in the following table.

| State | Rocker Actuator | AFCI LED |
|---|---|---|
| ON | GREEN | OFF |
| MID-TRIP due to overcurrent | RED | OFF |
| MID-TRIP due to Series Arc Fault | RED | STEADY ON |
| MID-TRIP due to Parallel Arc Fault | RED | BLINKING (1 s on/1 s OFF) |
| MID-TRIP due to Miswired Neutral | RED | BLINKING (3 s on/3 s OFF) |
| MID-TRIP due to Self-Test Failure (locked out) | RED | BLINKING (0.1 s on/0.1 s OFF) |
| OFF | WHITE (or BLACK) | OFF |

In the case of an AFCI/GFCI circuit breaker, the various states may be indicated as in the following table.

| State | Rocker Actuator | GFCI LED | AFCI LED |
|---|---|---|---|
| ON | GREEN | OFF | OFF |
| MID-TRIP due to overcurrent | RED | OFF | OFF |
| MID-TRIP due to ground fault | RED | STEADY ON | OFF |
| MID-TRIP due to Series Arc Fault | RED | OFF | STEADY ON |
| MID-TRIP due to Parallel Arc Fault | RED | OFF | BLINKING (1 s on/1 s OFF) |
| MID-TRIP due to Miswired Neutral | RED | BLINKING (3 s on/3 s OFF) | BLINKING (3 s on/3 s OFF) |
| MID-TRIP due to Self-Test Failure (locked out) | RED | BLINKING (0.1 s on/0.1 s OFF) | BLINKING (0.1 s on/0.1 s OFF) |
| OFF | WHITE (or BLACK) | OFF | OFF |

It is contemplated that the various states indicated by signals produced by the window 502 and/or the GFCI and AFCI indicators 503 may vary depending on the types of faults which the circuit breaker is capable of identifying, a display hierarchy for identifying particular faults, etc.

Circuit breakers may employ trip mechanisms, which include, without limitation, solenoids, bimetallic components, and/or hydraulic components. In the case of a trip mechanism which includes bimetallic components, the speed at which it trips is directly proportional to the amount of overcurrent passing therethrough due to the heat generated by the overcurrent. This is commonly referred to as a trip-time curve of a circuit breaker. Regulatory authorities such as Underwriters Laboratories (UL) define limits on the amount of time a circuit breaker may take to trip at a given current level. However, the trip-time curve may vary among circuit breakers depending on the application and requirements associated with a particular installation. Such variation in the trip-time curve is acceptable as long as it does not exceed the defined limit prescribed by applicable regulatory authorities.

Other trip mechanisms, such as solenoids, may trip near instantaneously once a given current threshold is reached. With such mechanisms, it may be beneficial to introduce a delay in tripping based on current level to replicate a trip-time curve.

In certain embodiments, circuit breakers may include mechanisms to introduce a delay in tripping based on a detected current level to replicate a trip-time curve. These embodiments are similar to the other embodiments describe above except that they include an additional current sensor to measure the current flowing through the branch circuit (not shown). The controller of the circuit breaker monitors the current level detected by the current sensor, and when the controller detects a fault or overcurrent, the controller may set a delay time before which it will trip the circuit breaker based on the current level sensed by the current sensor. The trip-time curve may be modified by the controller based on the desired circuit breaker operation. For example, the circuit breaker can be programmed with one or more of a plurality of trip-time curves to fit any given application. In addition, the trip-time curve could be customized or modified for a particular user based on the user's requirements while still meeting the defined limit prescribed by applicable regulatory authorities.

Figure 37:
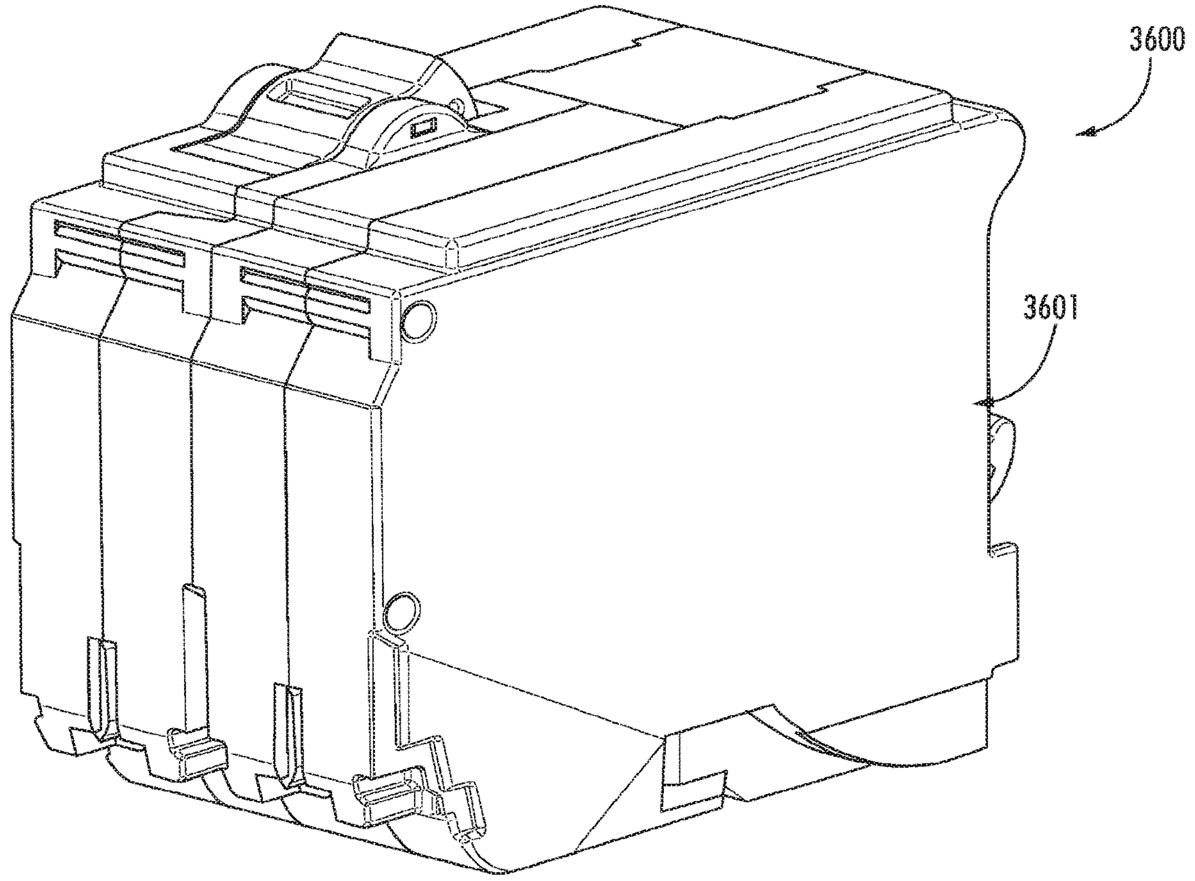
FIG. 37 is a perspective view of an embodiment of a double-pole circuit breaker in accordance with the principles of this disclosure.
Figure 38:
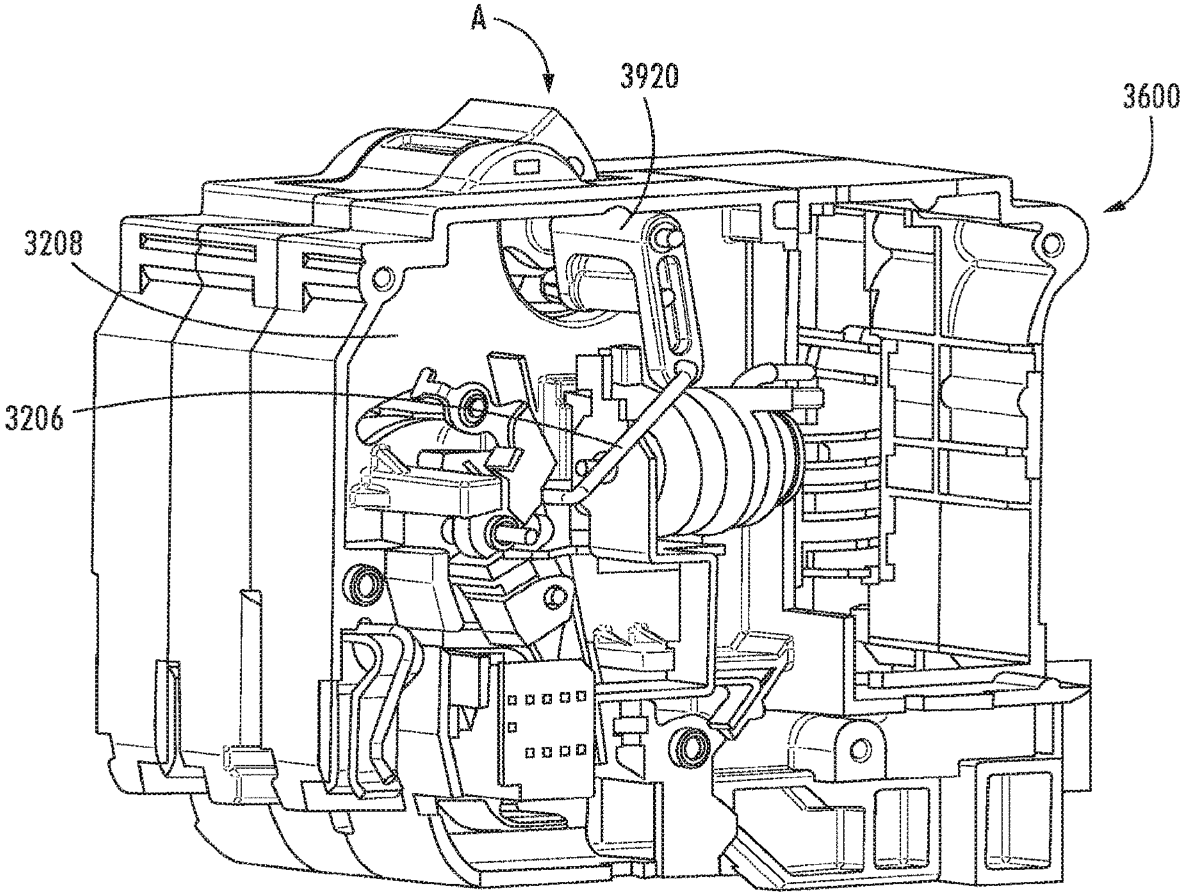
FIG. 38 is a perspective view showing internal components of the circuit breaker of FIG. 37 in accordance with the principles of this disclosure.

With reference to FIGS. 37 and 38, a double-pole circuit breaker is shown in accordance with aspects of the present disclosure. In various embodiments, a double-pole circuit breaker 3600 may include the single reset lockout mechanism 10 from FIG. 2 to lockout both circuit breakers of the double-pole circuit breaker 3600 during a fault condition.

Figure 39:
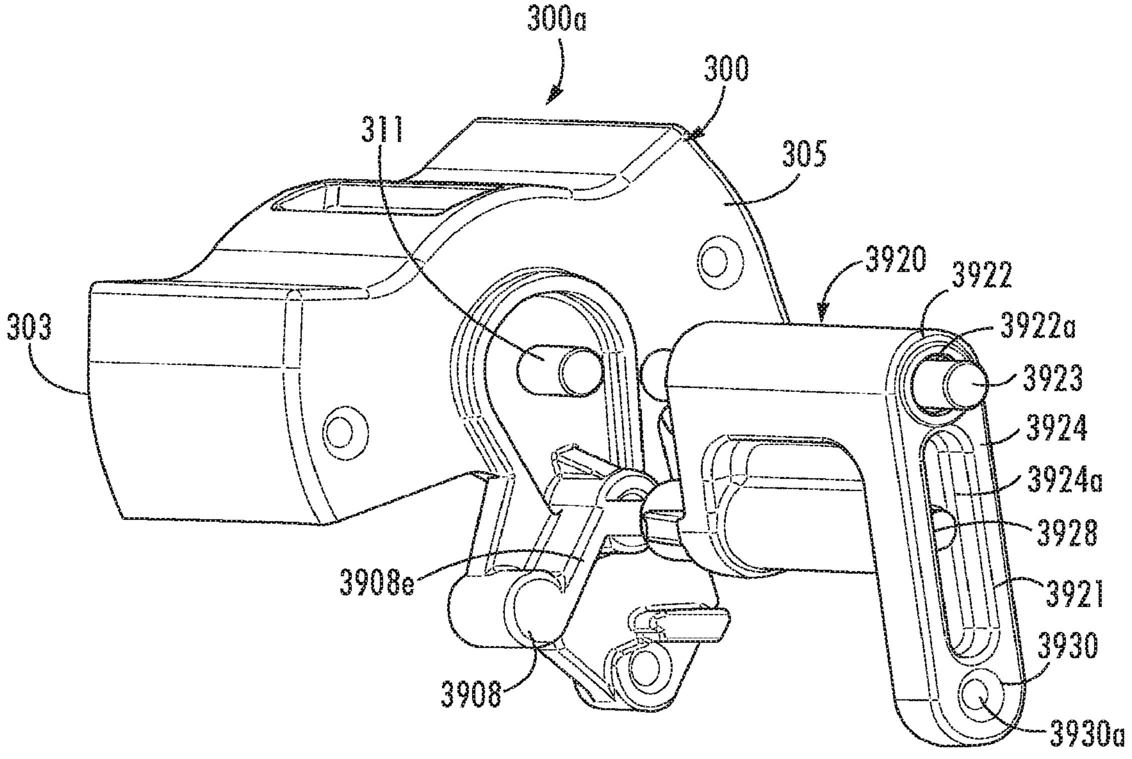
FIG. 39 is an enlarged perspective view of a rocker of a reset lockout mechanism of the circuit breaker of FIG. 37.

With reference to FIGS. 37-39, a rocker assembly **300*a* for the double-pole circuit breaker 3600 (see, e.g., FIGS. 37 and 38) is shown. The rocker assembly 300*a* includes rocker 300 and a rocker linkage 3920 extending laterally from rocker 300 and coupled to rocker 300 via pin 3928 so that rocker linkage 3920 can move with rocker 300 when rocker 300 moves between the ON and OFF positions thereof. Rocker linkage 3920 is configured to transfer mechanical movement of the rocker 300 to a second linkage 3206 of the double-pole circuit breaker 3600 to selectively position the double-pole circuit breaker 3600 between ON and OFF states thereof. The rocker linkage 3920 includes an arm 3921 with a first end portion 3922, a middle portion 3924, and a second end portion 3930. The first end portion 3922 defines a first hole 3922*a* that receives a first pin 3923 supported by double-pole circuit breaker 3600 to enable the rocker linkage 3920 to pivot relative to the housing 3601 of the double-pole circuit breaker 3600. The middle portion 3924 defines a depression 3924*a*, that may have a slot shape and which includes a portion that defines an opening 3924*b*. The opening 3924*b* is configured to receive pin 3928 that extends from the rocker 300. The second end portion 3930 defines an end hole 3930***a* configured to couple to the second linkage 3206 of the double-pole circuit breaker 3600.

Persons skilled in the art will understand that the structures and methods specifically described herein and shown in the accompanying figures are non-limiting exemplary embodiments, and that the description, disclosure, and figures should be construed merely as exemplary of particular embodiments. This disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of this disclosure, and that such modifications and variations are also included within the scope of this disclosure. Accordingly, the subject matter of this disclosure is not limited by what has been particularly shown and described.

What is claimed is:

1. A circuit breaker comprising:

a line phase terminal;

a load phase terminal;

a line neutral terminal;

a conductive path formed between the line phase terminal and the load phase terminal, the conductive path having an open configuration and closed configuration;

a sensor;

a linkage configured to move the conductive path between the open configuration and the closed configuration;

a rocker selectively engageable with the linkage, the rocker configured to move the linkage between an open position and a closed position; and an arm selectively engageable with the rocker, the arm to prevent the conductive path from moving to the closed configuration unless the circuit breaker passes a self-test when movement of the rocker is detected;

wherein a trip operation of the circuit breaker includes a time delay based upon an amount of current on the conductive path detected by the sensor.

2. The circuit breaker of claim 1, further comprising a controller, wherein the line phase terminal is in electrical communication with the controller when the conductive path is in the open configuration.

3. The circuit breaker of claim 2, wherein the controller is configured to log an operation of the circuit breaker as an event.

4. The circuit breaker of claim 3, wherein the event comprises a reset operation of the circuit breaker.

5. The circuit breaker of claim 1, wherein the sensor is configured to sense a ground fault.

6. The circuit breaker of claim 1, wherein the sensor is configured to sense an arc fault.

7. The circuit breaker of claim 1, wherein the sensor is a current sensor configured to measure current flowing on the conductive path.

8. The circuit breaker of claim 1, wherein the relationship between the time delay and the amount of current detected is defined by at least one trip-time curve; and wherein the at least one trip-time curve varies based on an operating mode of the circuit breaker operation.

9. The circuit breaker of claim 8, wherein the at least one trip-time curve comprises a plurality of trip-time curves.

10. The circuit breaker of claim 8, wherein the at least one trip-time curve is programmed for:

a particular user of one or more users; or a particular circuit breaker of one or more circuit breakers.

11. A circuit breaker comprising:

a line phase terminal;

a load phase terminal;

a line neutral terminal;

a conductive path formed between the line phase terminal and the load phase terminal, the conductive path having an open configuration and closed configuration;

a sensor;

a linkage configured to move the conductive path between the open configuration and the closed configuration;

a switch spring;

a rocker selectively engageable with the linkage, the rocker configured to move the linkage between an open position and a closed position, wherein the rocker further comprises a finger operatively coupled to the switch spring to mechanically engage the switch spring; and wherein when the switch spring is mechanically engaged, the circuit breaker is enabled to determine when a fault condition occurs; and an arm selectively engageable with the rocker, the arm configured to prevent the conductive path from moving to the closed configuration unless the circuit breaker passes a self-test when movement of the rocker is detected.

12. The circuit breaker of claim 11 where the switch spring is mechanically engaged during a portion of travel of the rocker.

13. The circuit breaker of claim 11, wherein the finger is located at a bottom side of the rocker, and the finger includes a switch engagement face that mechanically engages the switch spring.

14. The circuit breaker of claim 13, wherein upon the circuit breaker being in a first state, the switch engagement face pushes a distal end of the switch spring to prevent the switch spring from being in electrical communication with the conductive path, and wherein upon the circuit breaker being in a second state, the switch engagement face releases the distal end of the switch spring to enable the switch spring to be in electrical communication with the conductive path.

15. The circuit breaker of claim 11, further comprising a contact arm.

16. The circuit breaker of claim 15, wherein the contact arm is biased in a first position by a spring.

17. The circuit breaker of claim 15, wherein the contact arm includes a first contact to mechanically couple with a second contact.

18. The circuit breaker of claim 17, wherein upon the rocker being in a first position, the first contact is mechanically uncoupled from the second contact.

19. The circuit breaker of claim 15, further comprising a catch biased in a first position, wherein a downward force applied to the linkage rotates the contact arm and the catch.

* * * * *